(12) United States Patent
Bruce et al.

(10) Patent No.: US 6,539,080 B1
(45) Date of Patent: Mar. 25, 2003

(54) METHOD AND SYSTEM FOR PROVIDING QUICK DIRECTIONS

(75) Inventors: Les Bruce, Sunnyvale, CA (US);
Michael Jay Sinder, Chicago, IL (US);
Michael F. Mullarkey, Flossmoor, IL (US); Joseph Jamal Berry, Dearborn, MI (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/114,841

(22) Filed: Jul. 14, 1998

(51) Int. Cl.[7] .......................... H04M 1/64; H04M 3/42
(52) U.S. Cl. ............ 379/88.17; 379/72; 379/88.18; 379/88.19; 379/88.23; 379/201.08; 379/207.12
(58) Field of Search ...................... 379/88.01, 201, 379/207, 211, 216, 220, 229, 230, 246, 88.1, 71, 72, 76, 88.16, 88.17, 88.18, 88.19, 88.2, 88.23, 201.06, 201.07, 201.08, 207.12; 455/406, 456, 461; 700/209, 201, 208, 211, 212

(56) References Cited

U.S. PATENT DOCUMENTS

| | | | | |
|---|---|---|---|---|
| 4,190,819 A | * | 2/1980 | Burgyamn | 340/996 |
| 4,630,209 A | * | 12/1986 | Saito et al. | 701/201 |
| 4,812,843 A | | 3/1989 | Champion, III et al. | 340/905 |
| 4,974,170 A | | 11/1990 | Bouve et al. | 364/518 |
| 5,177,685 A | * | 1/1993 | Davis et al. | 364/443 |
| 5,214,793 A | * | 5/1993 | Conway et al. | 455/49.1 |
| 5,388,147 A | | 2/1995 | Grimes | 379/59 |
| 5,406,492 A | * | 4/1995 | Suziki | 364/449 |
| 5,682,525 A | | 10/1997 | Bouve et al. | 395/615 |
| 5,724,660 A | | 3/1998 | Kauser et al. | 455/456 |
| 5,727,057 A | * | 3/1998 | Emery et al. | 379/211 |
| 5,737,700 A | | 4/1998 | Cox et al. | 455/414 |
| 5,797,092 A | | 8/1998 | Cox et al. | 455/404 |
| 5,835,881 A | * | 11/1998 | Trovato et al. | 701/211 |
| 5,848,373 A | * | 12/1998 | DeLorme et al. | 701/200 |
| 5,873,032 A | | 2/1999 | Cox et al. | 455/414 |
| 5,903,228 A | * | 5/1999 | Ohgaki et al. | 340/995 |
| 5,913,170 A | | 6/1999 | Wortham | 455/457 |
| 5,926,117 A | * | 7/1999 | Gunji et al. | 340/988 |
| 5,943,417 A | | 8/1999 | Cox et al. | 379/266 |
| 5,950,161 A | * | 9/1999 | Kozuma et al. | 704/260 |
| 5,966,437 A | | 10/1999 | Cox et al. | 379/309 |
| 5,982,868 A | * | 11/1999 | Shaffer et al. | 379/220 |
| 5,983,161 A | * | 11/1999 | Lemelson et al. | 701/301 |
| 5,991,739 A | | 11/1999 | Cupps et al. | 705/26 |
| 5,995,826 A | | 11/1999 | Cox et al. | 455/414 |
| 6,018,710 A | * | 1/2000 | Wynblatt et al. | 704/260 |
| 6,021,371 A | * | 1/2000 | Fultz | 701/200 |
| 6,035,190 A | | 3/2000 | Cox et al. | 455/414 |
| 6,064,874 A | | 5/2000 | Cox et al. | 455/404 |
| 6,111,539 A | | 8/2000 | Mannings et al. | 342/357.09 |
| 6,169,515 B1 | | 1/2001 | Mannings et al. | 342/357.1 |
| 6,169,955 B1 | | 1/2001 | Fultz | 701/200 |
| 6,199,045 B1 | | 3/2001 | Giniger et al. | 705/1 |

(List continued on next page.)

Primary Examiner—Allan Hoosain
(74) Attorney, Agent, or Firm—Brinks Hofer Gilson & Lione

(57) ABSTRACT

A method and system for providing a telephone caller information assistance such as driving directions from a starting location to a destination location. To obtain information assistance, the caller places a telephone call to access the system. If the geographical location of the caller can be determined by an automatic location identification system it is displayed on an operator console where the caller's request is transferred to be handled by a live operator. The operator receives the caller's destination request and queries the system for the street route driving instructions to the requested destination. After obtaining the street route driving instructions, the call can be transferred to an audio box having an interactive user interface capable of replaying the desired information to the caller. In an illustrative embodiment, the interactive user interface is capable providing functions to stop, start, pause, and replay the information to the caller.

21 Claims, 18 Drawing Sheets

U.S. PATENT DOCUMENTS

| | | |
|---|---|---|
| 6,256,489 B1 | 7/2001 | Lichter et al. ............... 455/404 |
| 6,256,515 B1 | 7/2001 | Cox et al. ................... 455/565 |
| 6,396,920 B1 | 5/2002 | Cox et al. ............. 379/266.02 |
| 2001/0012772 A1 | 8/2001 | Cox et al. ................... 455/406 |
| 2001/0012773 A1 | 8/2001 | Cox et al. ................... 455/414 |
| 2001/0014598 A1 | 8/2001 | Cox et al. ................... 455/406 |
| 2001/0041562 A1 | 11/2001 | Elsey et al. ................. 455/414 |
| 2001/0044325 A1 | 11/2001 | Cox et al. ................... 455/565 |
| 2002/0004382 A1 | 1/2002 | Cox et al. ................... 455/414 |
| 2002/0013141 A1 | 1/2002 | Cox et al. ................... 455/409 |
| 2002/0057784 A1 | 5/2002 | Cox et al. ............. 379/218.02 |
| 2002/0085702 A1 | 7/2002 | Cox et al. ............. 379/218.01 |

\* cited by examiner

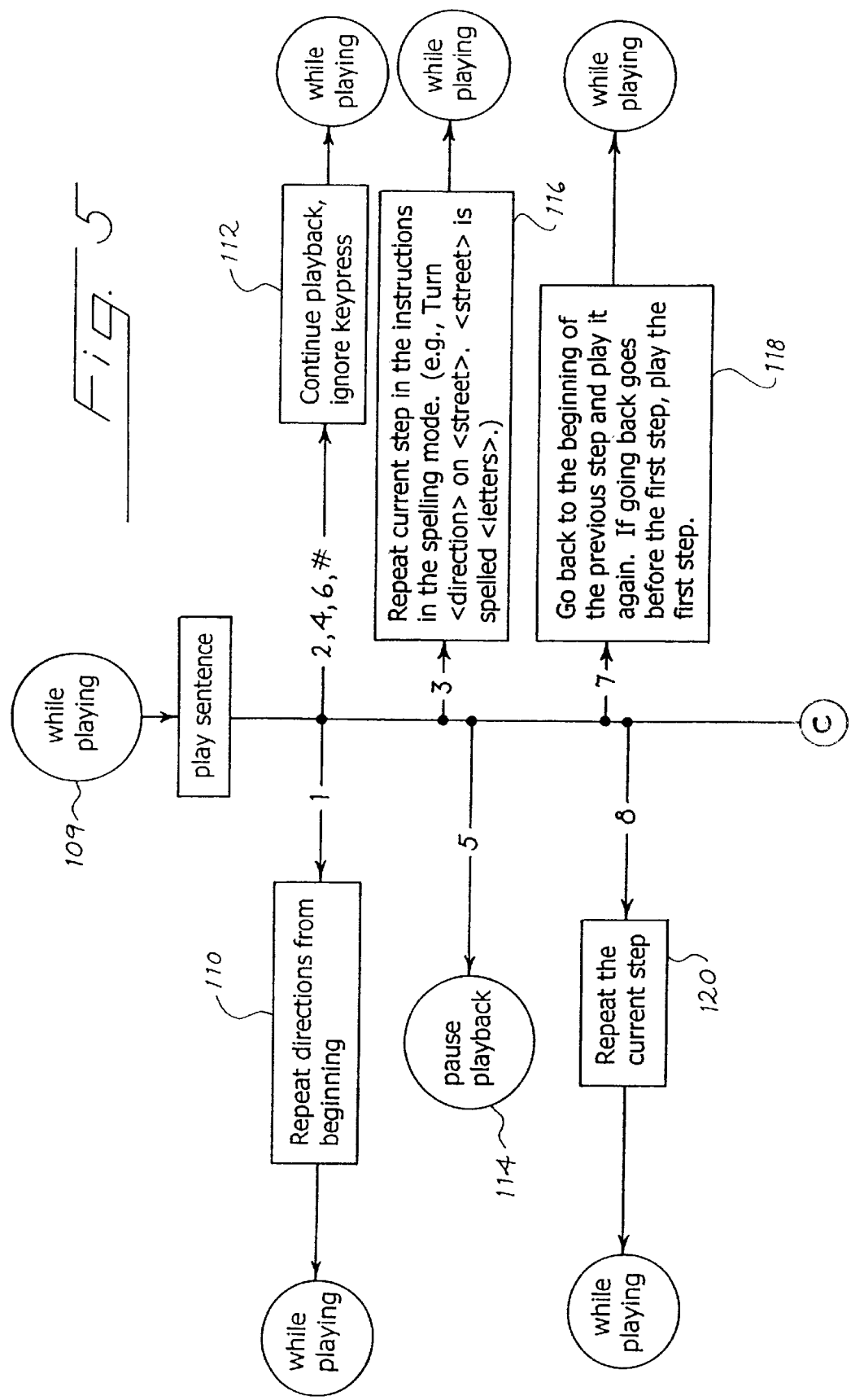

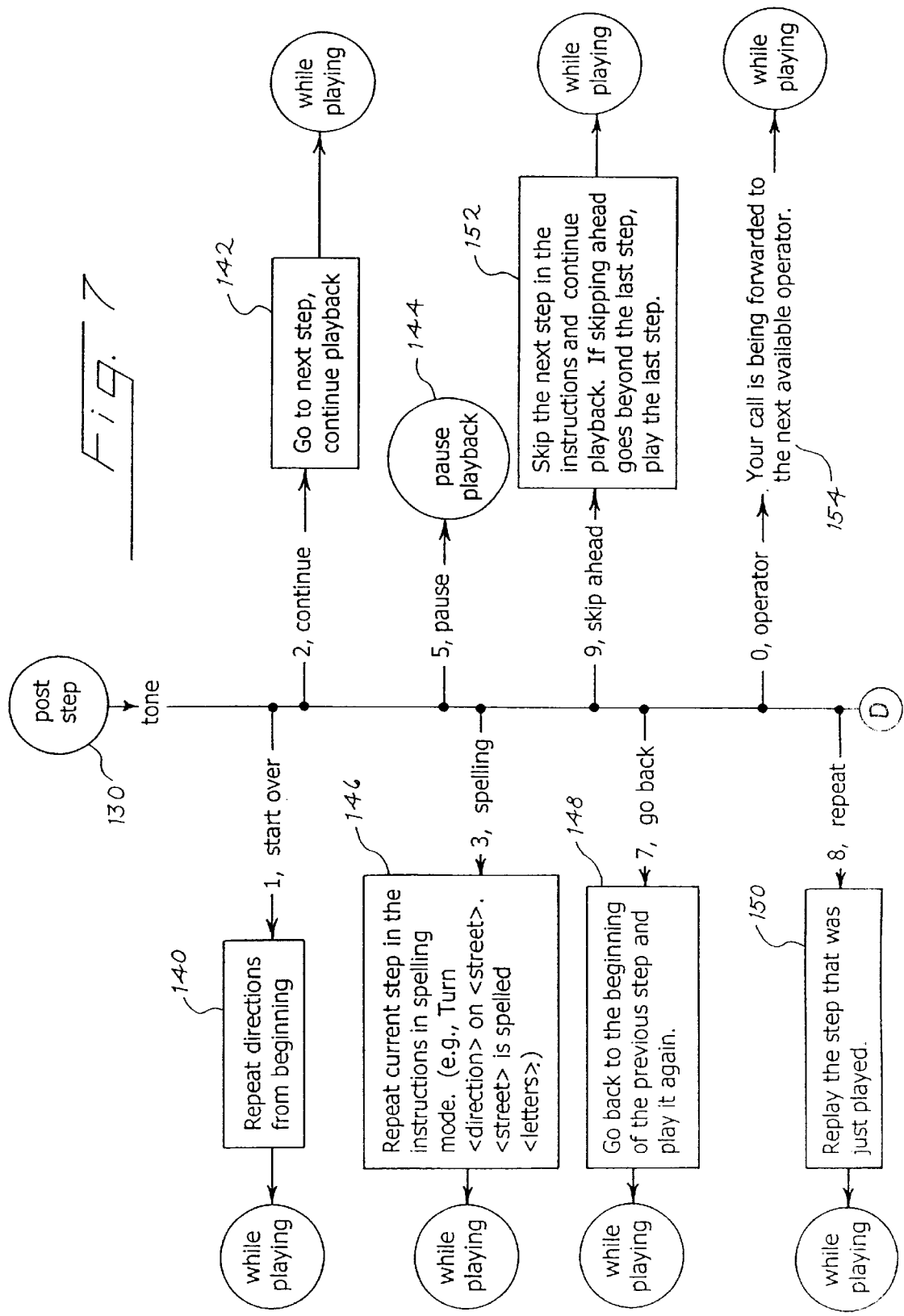

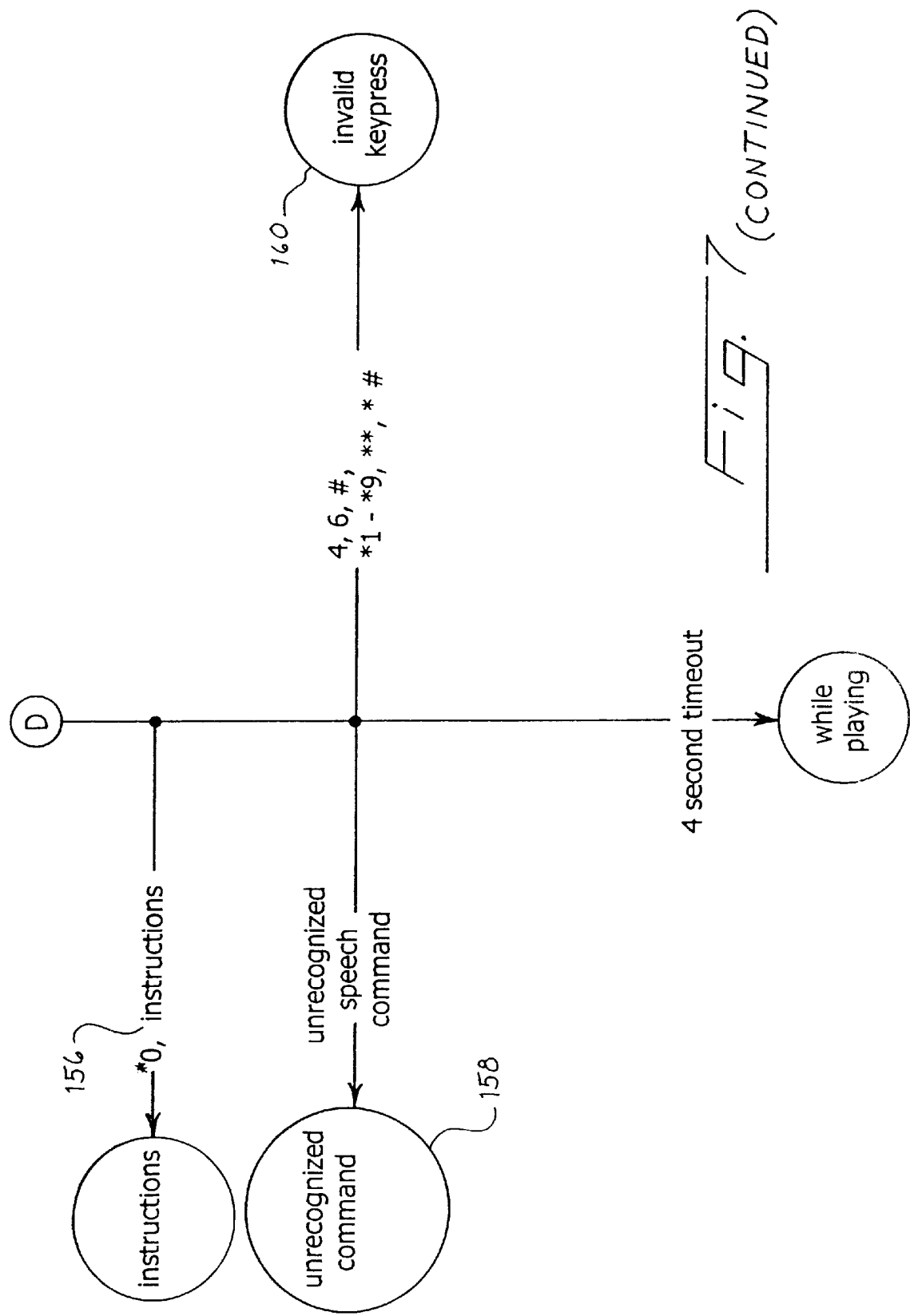

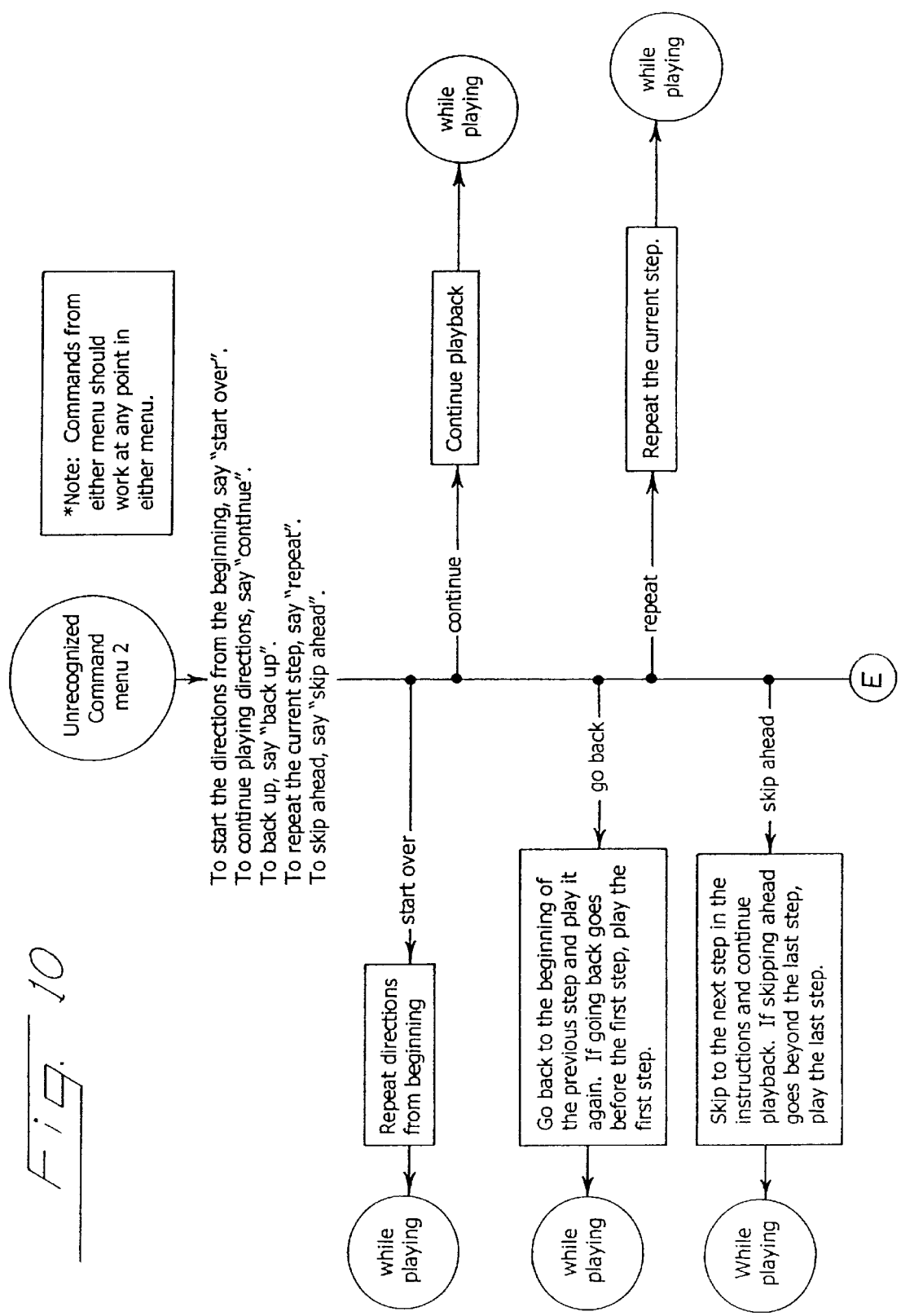

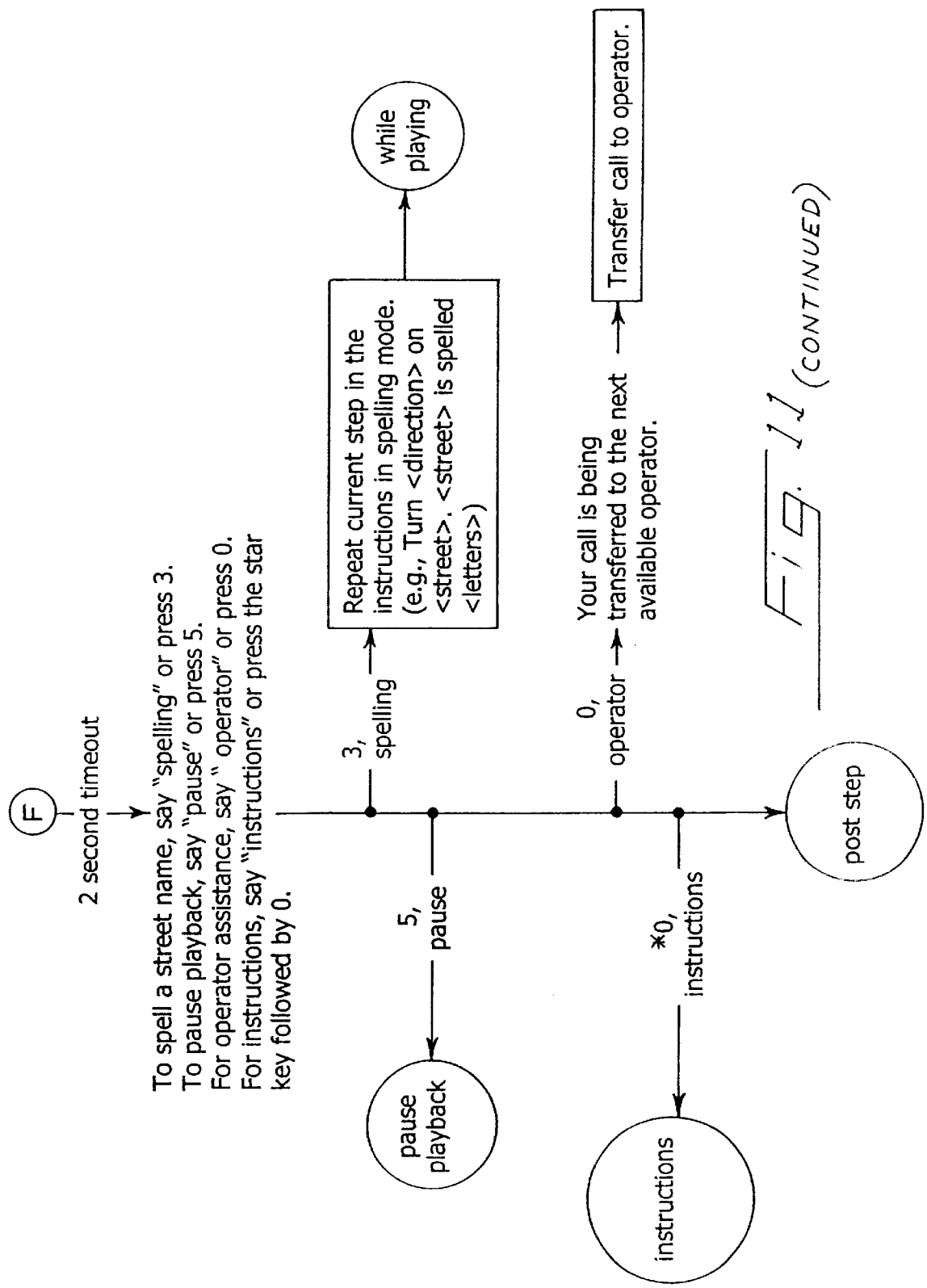

METHOD AND SYSTEM FOR PROVIDING QUICK DIRECTIONS

BACKGROUND OF THE INVENTION

A. Field of the Invention

The present invention relates to a method and device for providing information assistance to telephone callers. More particularly, the present invention is capable of providing information assistance based on an automatic identification of the caller's location and providing an user interface to communicate the information over the telephone to the caller.

B. Description of the Related Art

Today, travel directions to a destination location can be obtained in different ways. Internet web sites now provide map routing software that generate and display driving instructions from one starting location to another destination location. The traveler enters the desired starting (from) location and the desired destination (to) location into the software program and has the option to select the fastest, easiest, or shortest distance driving directions to the destination location. The map routing software determines the route to the destination and displays it on the user's display terminal with step-by-step driving directions, estimated travel times, and mileage from the starting location to the ending location. This type of map routing software, however, requires a traveler to plan his trip in advance and have Internet access. It is of little assistance in the situation when a traveler becomes lost during his trip, needs assistance with directions, and does not have ready access to the Internet.

Recently, Global Positioning Satellite ("GPS") navigation systems allow a traveler to track his location in real-time as he travels on the surface of the earth. In-car GPS-guided navigation systems allows an automobile driver to track his current location in real-time and obtain voice and visual directions on how to get from his current location to a destination location. Destination locations can be selected from an in-car terminal by street address, street intersections, or city. These on-board navigation systems also include categorical search tools that allow users to find points of interest such as museums, parks, airports, stores, etc. To reach his destination, the driver is given specific driving instructions from an in-car terminal on how far to proceed and when to turn and exit. These on-board navigation systems, however, are complex and expensive, require a considerable up front investment and a complex installation procedure.

Today, many wireless telephone service providers also provide a telephone service that allows users to dial "*nnn" or a 7/10 digit telephone number to reach a live operator who can provide expressway travel times, weather conditions and driving directions. The callers specify their current and future locations by providing the nearest cross street intersection or street address. Destinations can be selected by white or yellow page listings, street address, or cross street intersection. The live operator also has categorical search tools that allow callers to find points of interest. This service, however, requires the caller to specify their current location and is therefore not useful to those who are lost and uncertain of their current location.

In addition, the retrieval of driving instructions over the telephone requires a live operator to relay the driving instructions to the caller. The caller must transcribe each sequence of the driving directions while the operator waits on the telephone, thus reducing the productivity of the operator.

Needed is an improved system to information and travel directions, which is readily accessible to travelers.

BRIEF DESCRIPTION OF THE DRAWINGS

The foregoing and other objects, features and advantages of the present invention will be more readily appreciated upon reference to the following disclosure when considered in conjunction with the accompanying drawings, in which:

FIGS. 4 through 12 are command menu charts of an illustrative embodiment of the interactive user interface used in the system of FIG. 1.

DETAILED DESCRIPTION OF THE PREFERRED EMBODIMENT

Figure 1:
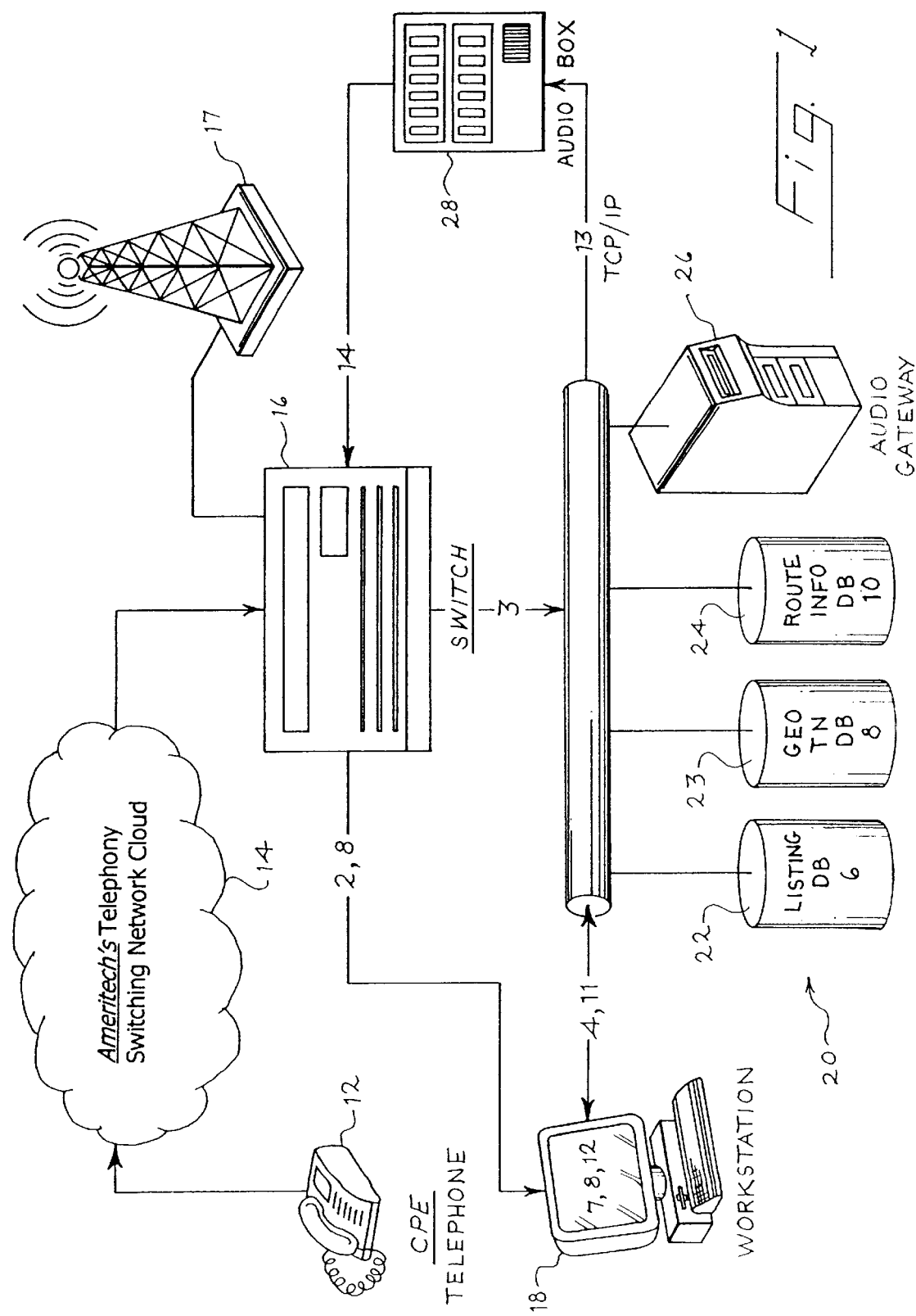
FIG. 1 is an overall system diagram of a system.

The present embodiment allows telephone callers to place a telephone call to a telephone number to obtain information and assistance in locating selected destination locations and obtain step-by-step driving directions to reach the selected destination locations over the telephone. An illustrative embodiment provides the ability to automatically identify the calling party's calling location without requiring the caller to manually identify his location. The calling location can then be used to map a route to the destination location and determine the proper driving instructions for the caller to arrive at the requested destination location.

In a described embodiment of the invention, telephone callers place a telephone call to access the system and select a desired destination location. The destination location may be selected from a white or yellow pages listing through an automated interactive voice response system or a live human operator. The destination location may be any locations such as a person or individual, or a street address, hotel, stores, restaurant, business office, etc. listed in the white or yellow pages directory.

After selecting the desired destination location, the caller may receive driving route instructions to the destination location from the system. For example, the caller's location and the desired destination location is sent to a database with application software which can map a route and provide driving instructions from the caller's location to the desired destination location or from another location to the desired destination location. The database and application software maps the driving route and determines step-by-step driving instructions to reach the destination. In a particular embodiment, the route to the destination location can be mapped taking into account the route traffic, travel-times, road conditions, and route weather conditions.

The caller may receive the driving or route instructions in a variety of different ways. The route instructions can be communicated directly over the telephone from an interactive voice response system, a live operator, a synthesized voice, a voice mail message, and Internet electronic mail, an alpha/numeric pager or telephone or a Personal Digital Assistant ("PDA").

In another aspect of the present embodiment, an interactive user interface to provide access to information over the telephone is described. The user interface is particularly adapted to provide a convenient interface so that a user can obtain route or driving instructions to a destination location over a voice telephone call. The user interface provides a number of commands or specified keys to allow a listener to easily stop, start, review, and skip through the step-by-step route driving instructions. The route instructions may be coded to demarcate points that are convenient points to stop and start the instruction messages such that the user can listen and record the instructions or listen and pause the instructions while they are actually driving the route. The user interface provides a convenient mechanism for callers to obtain the route instructions, as well as other information over the telephone.

FIG. 1 shows a system level diagram of an illustrative embodiment of the present invention. Shown in FIG. 1 are a telephone subscriber or caller 12 accessing the system as a caller seeking assistance, an access or switching network 14 such as the Public Switched Telephone Network ("PSTN") provided by local telephone companies such as Ameritech and long distance carriers such as AT&T and WorldCom/MCI. A switch device 16 such as a DMS-200 from Nortel or an Automatic Call Distributor ("ACD") such as those from the Rockwell Corporation, which provides access to and routes calls through the system. Also shown is an operator console or workstation 18 where a human operator to handle calls may be located, and a database 20, which may include a plurality of databases. In an illustrative example, the database 20 may include a directory listing database 22, a GEO TN database 23, and a routing database 24. Also shown is a gateway 26 interface that receives driving route instructions generated from the routing database 24. The gateway 26 interface translates the text route directions to interface the route directions to the audio box 28. For example, the route instructions may be generated in a text format that the gateway 26 interface translates to a data format appropriate for the audio box 28. The appropriate data format may be a specialized text format that can be forwarded on to the audio box 28. The audio box 28 translates the route instructions into audio speech that can be heard by a caller using speech synthesis. The audio box 28 allows a caller to retrieve directions without the continued interactive assistance of a human operator.

Described below in connection with FIG. 1 is an overview of an illustrative embodiment of the system in operation. A telephone caller or user 12 desiring assistance with a variety of services such as travel directions, maps, weather, traffic travel times, directory assistance white page listings, and road conditions originates a telephone call to a dial-in telephone access number to access the system 13. For example, a landline or a mobile cellular telephone subscriber 12 dials the telephone number of the dial-in access telephone number. The telephone call is routed through the switching network 14 to the dial-in access telephone line terminated to the switch 16. The switching network 14 may include the PSTN as previously described. The dial-in telephone access number is preferably a double digit, 7-digit, 10-digit or toll free telephone number such as an "800" or "888" telephone number. To provide greater call capacity, a high-capacity telephone line, such as a T1 or Primary Rate Interface circuit may be used to implement the access telephone line. Wireless telephone users may be configured to simply dial a "*NNN" to access the system. In a preferred embodiment, the service may be accessed through a basic "411" directory information service. For example, callers may dial 411 to obtain directory information and also be given the option to obtain street driving instructions to the requested directory listing. If driving route directions are desired, the telephone call may be routed to the appropriate operator console to handle obtaining the driving instructions. Alternatively, the system may be setup such that all the 411 operators are trained and equipped to handle the calls requesting driving instructions.

The switch 16 answers the incoming telephone call arriving on the access telephone number and forwards the call to the operator console 18 where a live operator can handle the call. The switch 16 can be any suitable switching equipment such as an ACD, DMS series switch from Nortel, #5 ESS from Lucent Technologies, Galaxy 500 or other Private Branch Exchange ("PBX") switching equipment. The switch may also be embodied as an automatic call distributor ("ACD") that automatically distributes incoming calls in the sequences that they are received.

Preferably, a call detail record data structure is also created and sent to the operator console 18 along with the forwarded telephone call. The call detail record may contain a variety of information regarding the arriving telephone call which can be displayed on the operator console 18 to provide the operator information regarding the incoming telephone call. In the illustrative embodiment, the call detail can include a number of pre-populated fields to show the operator a number of details regarding the call such as the calling telephone number, the called telephone number, the location of the caller, and the station type of the calling telephone number. Different station types such as coin or pay station, residence, or hotel telephone systems are well known to those skilled in the art. For example, in an illustrative embodiment the calling location of the incoming telephone calling is determined using a suitable calling telephone location technology 17 as will be described in further detail below. The location of the caller determined by the ANI is sent to the call detail record to the operator console 18.

Figure 2:
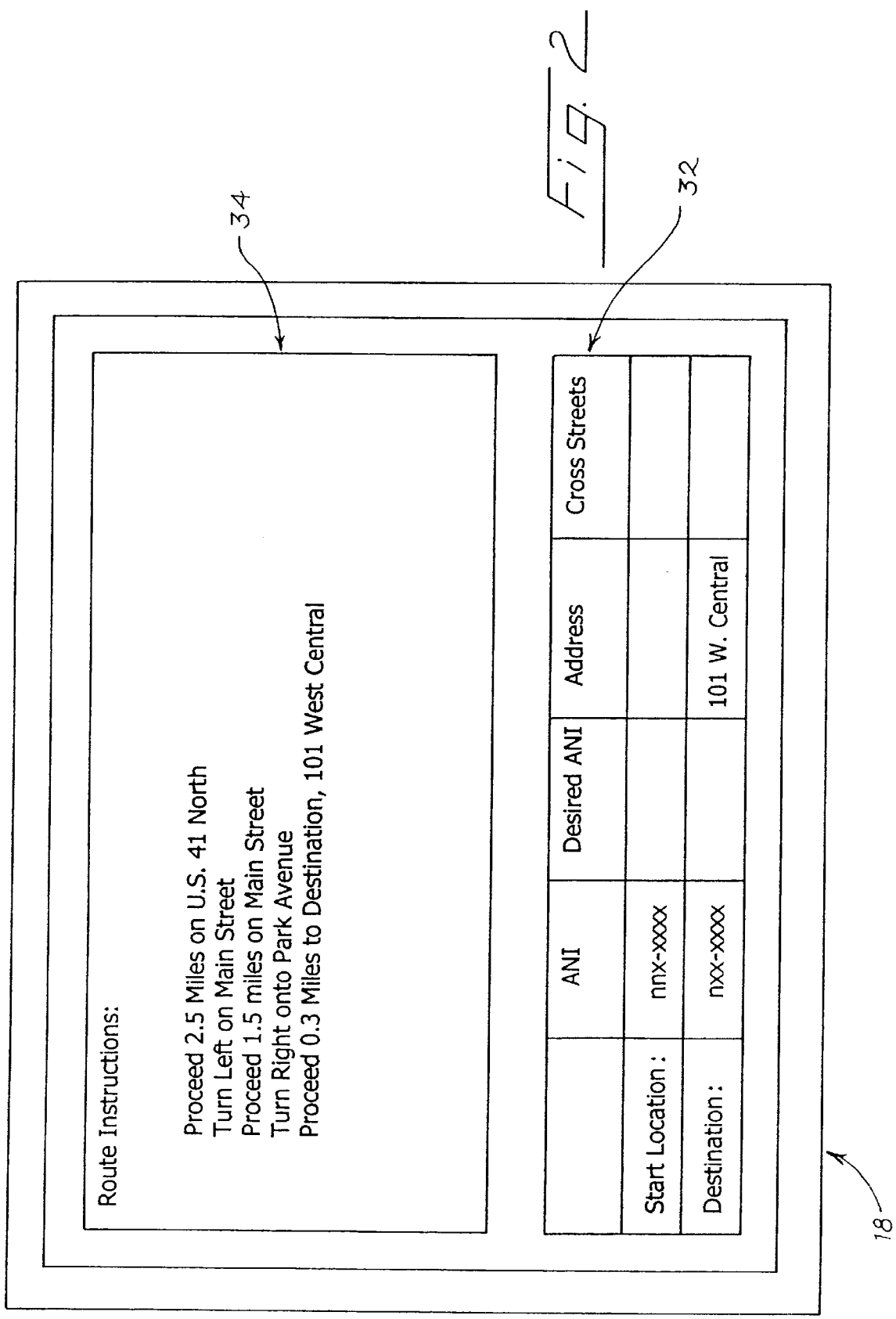
FIG. 2 shows an illustrative diagram of a call detail record used in the system of FIG. 1.

The operator console 18 displays the call details to the operator while the call is being handled. Referring now to FIG. 2, shown is an exemplary display of the operator console 18 while handling a call requesting directions to a destination location. It should be understood that FIG. 2 is a simplified illustrative drawing and the operator console display can be implemented as a Windows-type interface. At the bottom of the screen, a call detail window 32 can display call information from the call detail record, such as the ANI or location where the caller and the desired ANI where the caller wishes the directions to start. Often the caller's ANI and the desired ANI will be the same. The caller may also, however, request that directions be given from a different location, resulting in a different desired starting location. The address fields and the cross street information can be determined from the ANI and the database information. The station type of the caller may also be displayed, but is not explicitly shown in this example. The operator views the call details and queries the subscriber 12 for his or her request. Preferably, the caller's location is automatically identified and displayed on the operator console 18 as described above. Of course, the operator can request the caller for the starting location to confirm the automatically identified location. The operator can accept the information in the call detail window 32 or make any changes or correction to the information before making the request to the database to map the route.

The caller's request is entered into the operator console 18 or if the caller wishes to search for a destination location, a search is launched against a listing database for candidate listings according to the caller's request. In the illustrative embodiment of the invention, the listings that can be searched include desired destination locations such as street addresses, hotels, stores, restaurants, business offices and the like that may be listed in the white or yellow pages.

If the desired listing(s) is found, the operator quires the caller 12 whether directions are need to the selected destination location or for any other location the caller 12 may be interested in obtaining routing information. If the caller wishes to receive directions to the destination, the operator uses the starting and destination locations to determined an appropriate driving route between the locations.

The starting and ending locations are be applied to a database 23 containing Geo-coded location information to obtain the physical geographic coordinates of the desired locations. The physical geographic coordinates allow the geographic locations of starting and destination locations to be determined. A geo-coded database provides geographic vertical and horizontal location coordinates in the form of latitude and longitude coordinates for nodes such as street addresses and significant landmarks.

Figure 3:
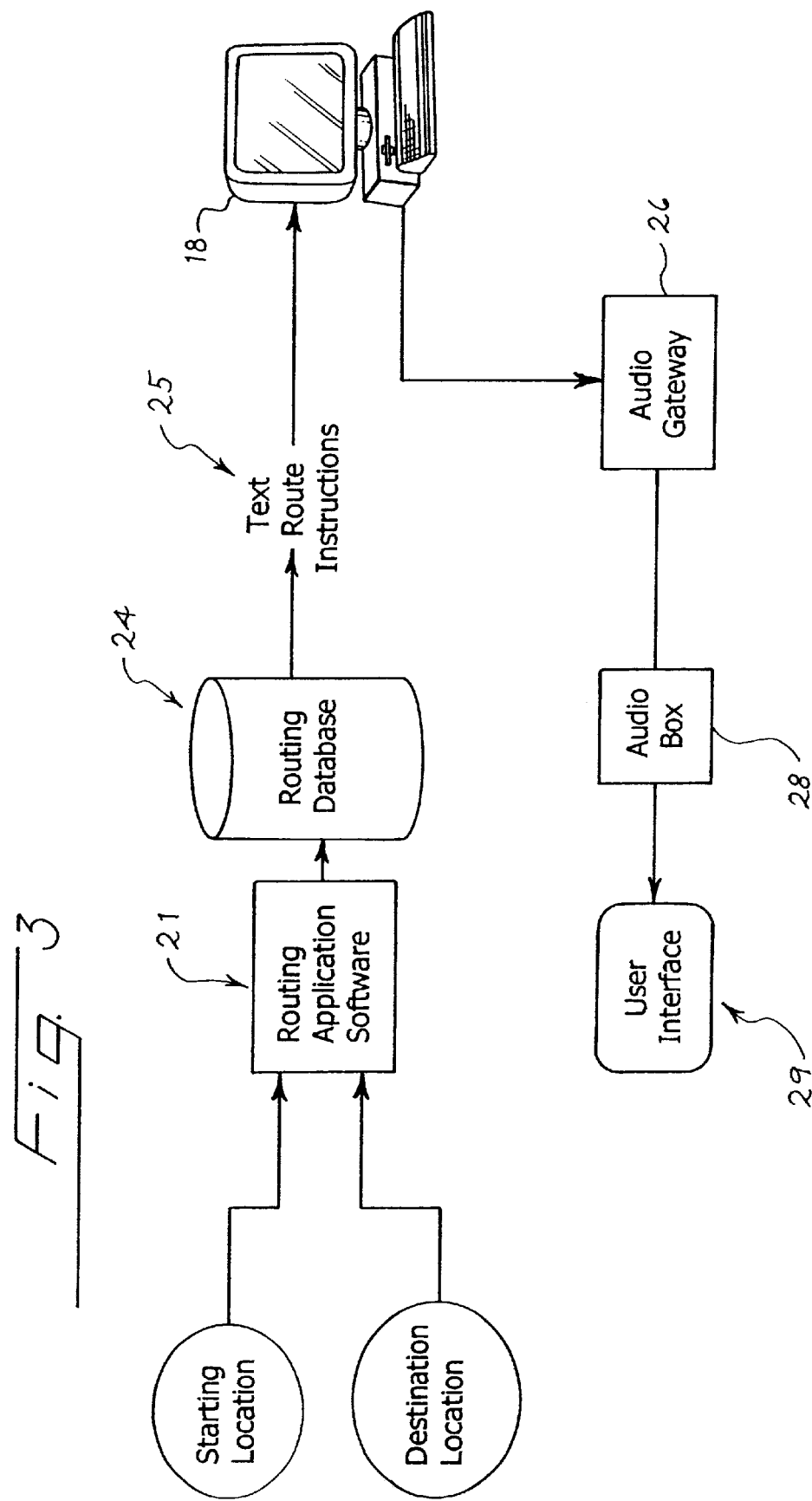
FIG. 3 shows an diagram of the generation of route instructions used in the system of FIG. 1.

Referring to FIG. 3, the starting and destination locations are applied to a database 20 to map a route and create step-by-step route driving instructions between the starting location and the selected destination location. Preferably, a map routing software program 21 applies the geo-coordinates of the selected locations to the routing database 24 to determine appropriate routing instructions 25 from the starting geo-coordinate to the ending geo-coordinate as will be described in more detail below. In the illustrative embodiment, the route instructions or driving directions 25 are step-by-step street driving instructions. The route instructions 25 can then be passed to the operator console 18 for the operator to view and relay to the caller. Referring again to FIG. 2, the route instructions can be displayed on the main portion or window 34 displayed on the operator console 18. Preferably, the instructions are demarcated in a step-by-step manner as illustrated in FIG. 2.

To communicate the route information 25, the operator may simply recite the route instructions to the caller, or alternatively may release the route instructions 25 to the text-to-speech audio system to automatically play the instructions to the caller. The text-to-speech audio system preferably includes an audio gateway 26 and audio translation box 28 suitable for translating text route instructions 25 to synthesized speech. In addition, the audio translation box 28 preferably includes an interactive user interface 29 that allows a user to control the playback of the driving route instructions. Using the interactive user interface 29, a user can receive the route instructions 25 and control how the route instructions 25 are played back without the assistance of a live operator at the operator console. Use of the audio box 28 to provide instructions to the caller also improves the productivity of the human operator. The operator can pass the call on to the audio translation system to communicate with the user and proceed to handle the next caller.

Described below is a description of an illustrative embodiment of the present invention providing a more detailed description of the particular components.

Referring again to FIG. 1, to initiate access to the system, the caller 12 preferably originates a telephone call to a dialup access telephone number. Telephone calls are primarily originated from either traditional fixed location landline telephones or mobile wireless telephones. Mobile wireless telephone may include cellular, personal communication systems ("PCS"), satellite telephones, etc.

After the telephone call is answered by the switch 16, the geographical location of the telephone caller is determined using an appropriate caller location system 17 capable of identifying the geographical location of the caller. To identify the geographical location of the caller 12, several techniques can be used depending on the particular telephone (i.e., landline or mobile telephone) originating the call. Several exemplary telephone caller location identification systems 17 are described below in further detail. The location of the caller 12 can then be communicated to the operator by including the geographical location with a call detail record data structure that is transferred to the operator console 18.

For example, the location of a telephone caller 12 from traditional fixed location land-lines can be identified using the automatic number identification ("ANI") of the originating calling telephone number to index into a directory listing database or Name, Address and Telephone number Database ("NATD") 22. From the ANI of the calling telephone number, the NATD 22 can be accessed for the address of the originating telephone number. The originating telephone number address can then be used to determine the geographic location of the telephone number by accessing the Geo TN or Geo-code database 23.

In the exemplary system 14, automatic number identification ("ANI") or a calling number location identification may be used to identify the originating calling telephone number which is passed in the call detail record to the operator console 18. In the illustrative embodiment, the operator console 18 may access an IBM Reduced Instruction Set Computer ("RISC") with the AIX operating system such as provided with the directory assistance platform from the IBM Corporation. The operator console 18 can then access NATD database 22 to return the street address associated with originating telephone number. Preferably, the NATD database 22 contains the street address of all the telephone lines located in the contiguous United States. Such a NATD 22 can be provided in conjunction with the nationwide directory assistance platforms operated by the local exchange carriers or other telephone service providers. In the preferred embodiment, the NATD database 22 also contains physical geographic location information for each telephone line in the database as implemented in the Geo-code database 23. For example, each telephone line listing may include physical location or geographic coding ("geo-coding") parameters such as physical x, y coordinates which can be utilized to identify the address and latitude and longitude coordinates of the originating telephone line. The physical location of a fixed land-line telephone call can be determined using ANI to identify the calling telephone number and then using the calling telephone number to index into the NATD database to access the geo-code location of the calling party as described above. Preferably, significant landmarks such as cross-street intersections, interstate highway exit numbers, local communities are also added to the NATD database with x, y geo-coding.

If the ANI telephone number of the caller 12 is matched by the NATD database 22, the NATD record with the geo-code of the caller's location is included in the call detail which is passed on to the operator console 18. If the caller's calling location cannot be automatically determined, a message is indicated in the call record sent on to the operator. The caller's location must then be manually identified through interaction with the human operator that the caller location was not available.

In another illustrative embodiment with wireless mobile telephone, the callers 12 may be mobile and their location will most likely vary with each telephone call. In this illustrative embodiment, an automatic location identification ("ALI") technology 17 is preferably used to determine the location of wireless telephone callers. The most common type of ALI technology 17 for mobile wireless telephones utilizes a network-based approach that applies mathematical algorithms to the attributes of the wireless telephone radio frequency ("RF") signals received at a base station of the wireless network. Such location algorithms using the precise timing in which the RF signal arrives different base stations, the angle of arrival of the signal, and the amplitude of the signal are well known to those skilled in the art. To analyze RF signals, additional electronic hardware to analyze and locate the origin of the signals is required at the base stations. The main advantage of a network-based location technology is that it can be utilized with existing networks using existing telephone wireless handsets. A separate network to locate the caller and new caller handsets are not required.

Alternatively, ALI of mobile wireless telephone calls may be implemented with a dedicated radio location network using a separate infrastructure and different frequencies than those used by cellular, PCS, paging, mobile satellite or SMR carriers, to determine the location of the caller. A dedicated location network is employed to triangulate the position of the caller though an analysis of RF signals received at different points in the location network. Presently, the primary frequency band used for radio location is known as the location and monitoring services ("LMS") band at 902–928 MHz. An example of an ALI technology using a dedicated radiolocation network is provided by Teletrac, Inc. The Teltrac system is available primarily in major metropolitan areas for fleet management solutions such as automatic vehicle tracking ("AVL") and related assets tracking services. In addition, the most prevalent ALI technology today is Global Positioning Satellite ("GPS") technology. GPS technology uses a network of 24 earth orbiting satellites to track a GPS receiver's location on the earth with an accuracy between 60 and 300 feet. The GPS receiver's location is determined by triangulating a timing and distance measurement between a plurality of the earth orbiting GPS satellites and a GPS receiver on the surface of the earth. GPS location frequencies are provided by U.S. Government at well-known frequencies. Location technology equipment is available from a number of manufacturers such as Rockwell, Trimble or Navtech.

After the originating geographic location of the incoming call is determined, the call is sent to an operator console 18 to allow callers 12 to specify their desired destination location. Switching device 16 switches the incoming telephone call to the operator workstation 18 to connect the call with a live operator. The operator workstation 18 will display the ANI and calling location of the telephone caller 12 to the operator console 12 if the ALI has determined the caller's location. If ALI could not identify the caller location, the call detail will not show the caller's location on the operator console 18 and the live operator must query the caller to manually obtain the originating calling location.

After the location of the caller is identified, the caller location is included in a call detail that is sent to the operator console 18 and displayed to the operator. Because a caller's location has been determined, the operator need not query callers for their location unless there was problem with the ALI. The operator can then move on to immediately query callers for their requests, thus speeding the handling of calls and increasing the productivity of the operator.

The present embodiment can provide a variety of services for callers 12 such as those provided by directory assistance, weather, time of day, yellow pages assistance, etc. For example, in an illustrative embodiment a caller 12 may wish to obtain travel directions from his current location to a selected destination location. Callers 12 may request the operator conduct a search for a selected destination locations in a variety of different ways. For example, the caller may be seeking the restaurant or grocery store nearest his calling location. Using the location identified by the ALI, the operator can launch a database search for any such establishments in the proximity of the caller. In an illustrative embodiment, the destination location is selected from a white pages listing database that includes complete address information, x, y coordinates and geo-codes for each listing. The address information preferably includes street, city, state, zip code, municipality, community, and the county of the listed locations. In addition to simply identifying the listing, individual listings in a database 20, such as a white pages listing database, can preferably be selected or categorically searched in many different ways. For example, the white page listings database may include a search engine that can search the database by street, city, state, zip code, municipality, community, county or any combination of fields. Appropriate search engines are available from a variety of sources including the IBM Corporation. The database 20 may also allow the selection of listings by category type of the listing, i.e., restaurants, gas stations, stores, libraries, airports, etc. In addition, the database 20 may also be searched for locations within a specific proximity or specified distance from the caller's location. In such a proximity search, the geo-code location of the caller is identified and the geo-codes of the categories of entries are searched for those entries within the desired location. In addition, various combinations of the different criteria may be utilized to search and select white page listings.

In a particular embodiment, callers may request information from the operator and select destination locations. The operators can access and search the database 20 in accordance with callers' requests to obtain and view the search results. The operator can also interactively relay listings, search results, and step-by-step driving instructions back to callers 12.

In an illustrative embodiment of the invention, it is contemplated an automated interactive voice response system provided by the audio box 28 allows callers 12 to access the information without requiring a live human operator. Alternatively, a user may access the system using a computing device with a modem and a computer display. Preferably the computing device is a portable computer such as a handheld or pahntop computer which can be used by a caller who is traveling and away from the office. The portable computer may have any suitable interface and display for showing text and preferably even graphics capability for displaying maps. The portable computer may have a Windows CE, Palm OS, Apple Newton or other operating system suitable for a portable computer. Suitable computing platforms include portable devices such as a Palm Pilot, Apple Newton, portable Windows CE machines, or similar portable machines from Psion, Phillips, Hewlett-Packard, and other manufacturers of portable computing devices. These portable-computing devices can be used to access into the system on a dialup telephone line that can be provided to allow access by a computer terminal. Once accessed to the system, the user can operate the system through a computer interface, without requiring an operator.

After determining the caller's location and identifying the caller's desired destination location, a route between the two locations can be mapped and step-by-step driving directions generated according to the mapped route. The map routing software typically includes a database 20 such as a route information database 24 storing map routing information. The map routing software is applied to the database 20 preferably containing street map or routing information to derive the appropriate route between the locations. The map routing software takes a starting location and a destination location and maps a route between the two locations using the geographic location coordinates of the starting and destination locations. The mapped route can then be used to generate concise step-by-step driving or route instructions from the starting location to the destination location. The total distance of the mapped route and estimated driving time and estimated time of the caller's arrival can also be provided. Preferably, the mapping software converts east, west, north, and south directions into left and right turn instructions. Map routing application software capable of generating driving directions are well known to those of skill in the art. For examples, such software can be found on the Internet at sites such as Mapquest, Expedia, Citysearch, and Mapblast.

In a particular embodiment, the mapping application software can be provided in conjunction with a variety of real-time information such as weather, traffic travel times, and road conditions. For example, local transportation authorities offer real time traffic information on the local highways and interstate roads. These systems typically provide travel times between selected locations as well as the speed of moving traffic at road sensors embedded into the roadway monitoring the speed of moving traffic. Road construction information is also provided by the location of the construction (i.e., "Eastbound I-88 at the Fox River Bridge"), the construction type (i.e., "Road Closure" or "Lane Closure") and the duration of the closure (i.e., "Feb. 20, 1998 08:00 to Feb. 20, 1998 14:00"). An example of this type of information is provided by the Gary-Chicago-Milwaukee ("GCM") Priority Corridor - Illinois Department of Transportation, Indiana Department of Transportation, and Wisconsin Department of Transportation in cooperation with the University of Illinois at Chicago Department of Electrical Engineering and Computer Science. The federal government has provided funding for these types of projects in the IVHS Act of 1991 as part of the Intermodal Surface Transportation Efficiency Act of 1991. Additional information can be found at the GCM web page on the Internet. The traffic/construction information can be used by the system to avoid routes that are closed or are experiencing undue delays due to construction. The system can be programmed to avoid mapping routes through construction routes by creating alternative routes, or recalculating routes not using the sections of road under construction.

The map routing application software generates text route instructions in a format that is human or machine-readable. The text route instructions can then be transmitted to the operator console 18 to allow the operator to view the route instructions. The operator may then relay the route instructions to the caller.

The mapped route and step-by-step driving directions can be conveyed to callers in a variety of different ways. Of course, the step-by-step travel directions can be retrieved by a human operator and relayed to a caller by having the human operator read the directions over the telephone to the caller. Requiring a live operator read driving route instructions, however, may be cumbersome and require the operator spend a long amount of time with each caller. The operator must read the directions and wait for the caller to hear and record or transcribe each step of the directions before the operator can release the call and proceed on to the next caller. The amount of time spent with each caller is thus relatively accordingly long, reducing the number of calls the operator can handle, and requiring a large number of operators to handle the expected volume of calls.

Callers accessing the system using a portable-computing device may download the route instructions to their computing device and review the instructions as necessary. The route instructions can be communicated over a telephone line using standard telephone modems, without requiring the interaction of an operator.

In another embodiment, callers receive the routing instructions over the telephone without requiring a portable-computing device or the interaction of a human operator. In this particular embodiment, the operator console 18 sends the text routing instructions from the route database 24 to an audio gateway 26 that interfaces the text instructions to a data format suitable for the audio box 28. The operator console 28 also transfers the telephone caller 12 to the audio box 28, which can then provide an interactive user interface to communicate the route instructions over the telephone.

For example, after retrieving the driving directions, the operator console 18 transfers the call to audio box 28. The audio box 28 provides the interactive user interface system to communicate route instructions to the caller 12. Preferably, the interactive user interface provides an interactive voice response system with speech recognition to implement an automated user interface to provide information to callers. The audio box 28 may include an Interactive Voice Response ("IVR") system having speech recognition and speech synthesis capability. Suitable audio speech boxes are available from the Lucent Corporation which can be programmed with the assistance of the descriptions herein.

The interactive user interface communicates the driving instructions to the callers and provides callers the ability to:

Pause and continue messages

Back up to previous steps or messages

Skip ahead to successive steps in the directions

Spell street names

Get instructions about using the system

Repeat instruction from the beginning

Return to a live operator

The system allows the caller to speak commands or use the touch-tone keypad on the telephone handset to enter commands to control the playback of the directions. Preferably, the interface supports dual tone multi-frequency ("DTMF") input and speech recognition with word spotting and barge-in capability. For example, after every menu and at each step of the instructions, a prompt tone is played to users to indicate the availability of the speech recognition commands. Preferably, the DTMF commands are always available to the user. The user will be allowed to perform actions with the DTMF commands while listening to instructions for using the system. Announcements and error messages are interruptible by the DTMF commands. Error messages, however, should not be interruptible. Preferably, the DTMF interface also supports a type-ahead buffer to allow users to move through the menus and select commands and options without waiting for the system prompts through the menus.

Travel directions may be given to callers using speech synthesis with a specialized vocabulary provided by the audio box. The route instructions or directions are given in a sentence-by-sentence manner and segmented or demarcated by the system on a sentence-by-sentence or turn-by-turn basis. Preferably, the directions are demarcated at each point where the user is given an instruction to turn onto a new street in the route. At each demarcation point, users will be offered a command to repeat, pause, continue, backup, as well as other options.

In the illustrated embodiment of the invention, the instructions and commands for a caller retrieving directions to a destination location are shown in FIGS. 4 through 12. Callers are urged to pull off the roadway before calling the system for assistance. However, it should be anticipated that callers may access the system while driving (against their better judgment), often while simultaneously attempting operate a motor vehicle and not have their hands free for manipulating a keypad. Thus, while receiving directions it is desirable that the caller can control the playback of directions with vocabulary of voice recognized verbal commands using the speech recognition described herein.

FIGS. 4 to 12 show flow charts of the possible menu selections at various points in the interactive user interface menu.

Figure 4:
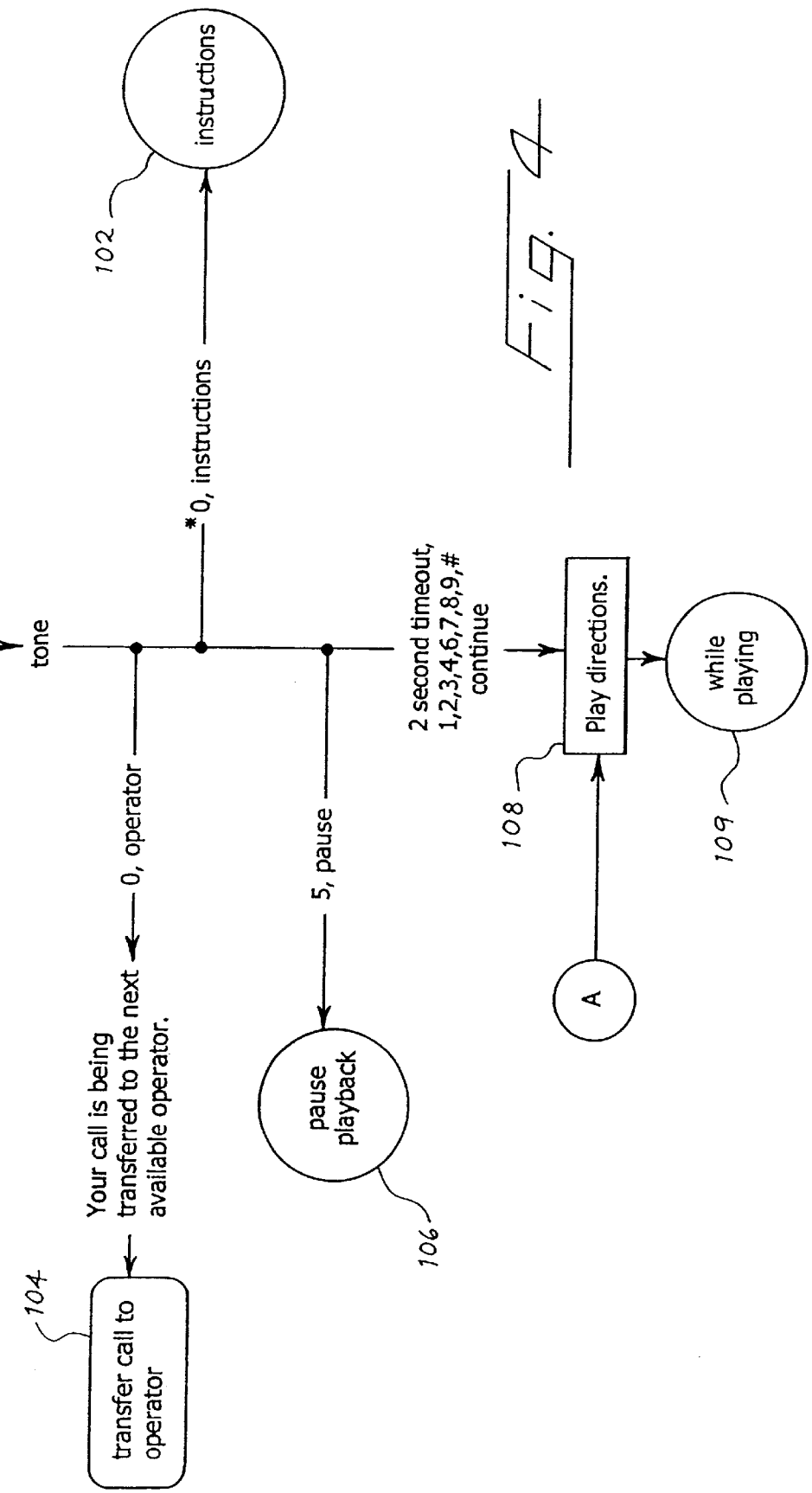

Referring to FIG. 4, shown is a flow chart of an introductory statement played to a user allowing the user to obtain further instructions. At step 102, the users may verbally request "instructions" or press the star key "*" followed by the "0" key to hear instructions about using the system. The interactive user interface includes speech recognition to recognize the users'verbally spoken commands to initiate the appropriate menu selection. The speech recognition is programmed to recognize a number of spoken key words that correspond to various menu selections. At step 104, the user may select the option of being transferred to a live operator by speaking a key word such as "operator" or pressing the "0" key. At step 106, pause of the playback of the system can be selected by saying "pause" or entering the "5" key. At this particular menu level, selecting the pause feature will pause the system for about 2 seconds. Playback may also be resumed by entering any key selection. At step 108, the information, which may include the route instructions, are played to the user. Step 109 represents the route instructions being played to the user.

Figure 5:
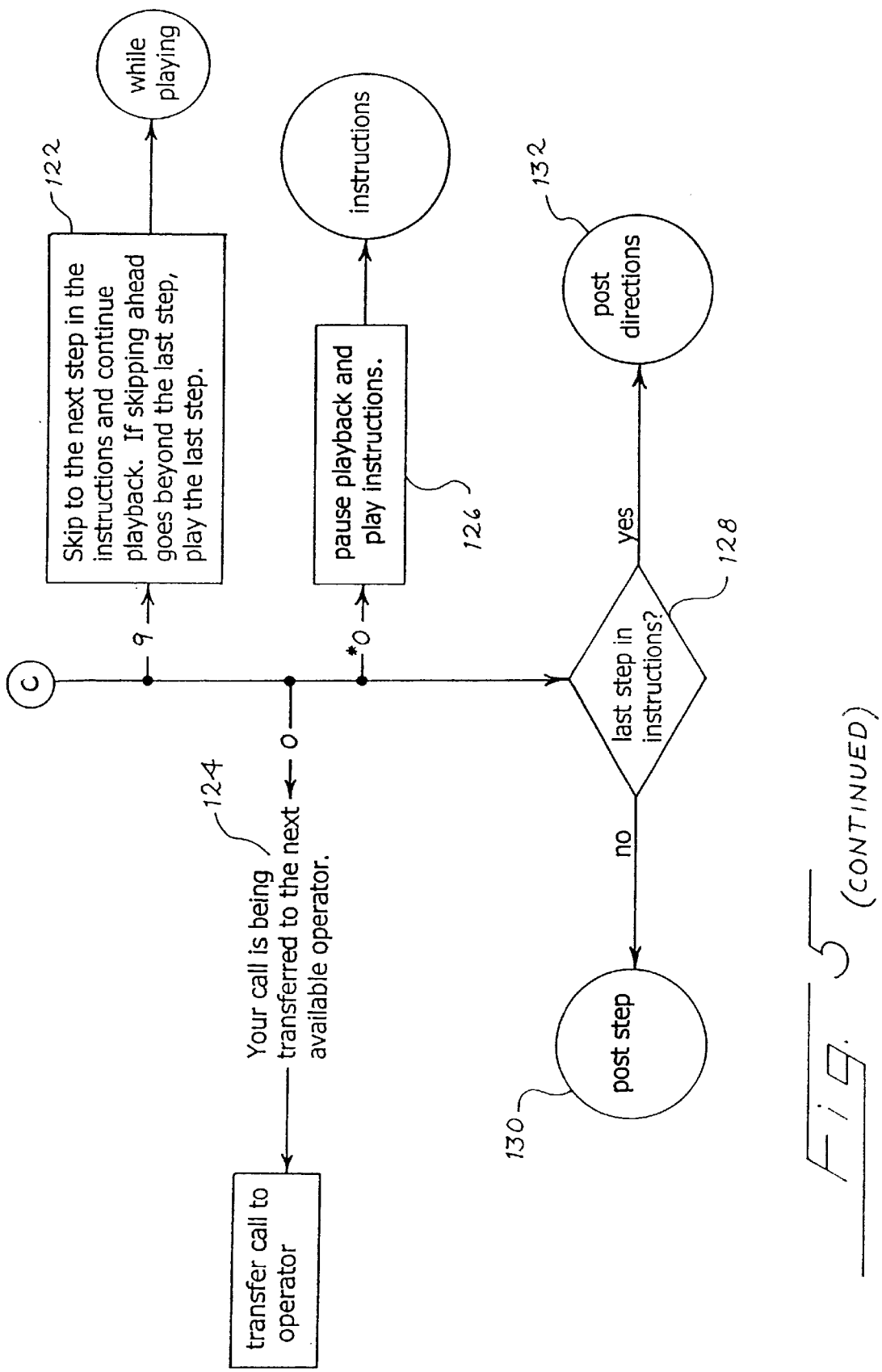

Shown in FIG. 5 are several possible menu selections available to users while the route instructions are being played such as at step 109. As shown in FIG. 5, users can start the playback of the retrieved directions over from the beginning by stating "start over" or by pressing the "1" key on the keypad at step 110. After hearing each step in the directions, the user can say "continue" or press the "2" key to hear the next step of the route instructions at step 112. At step 114, the user can pause the playback of the directions by stating "pause" or by pressing the "5" key. Playback can be resume by saying "resume" or by pressing the "5" key again. The menu selections available from the pause features will be described in more detail below.

Figure 6:
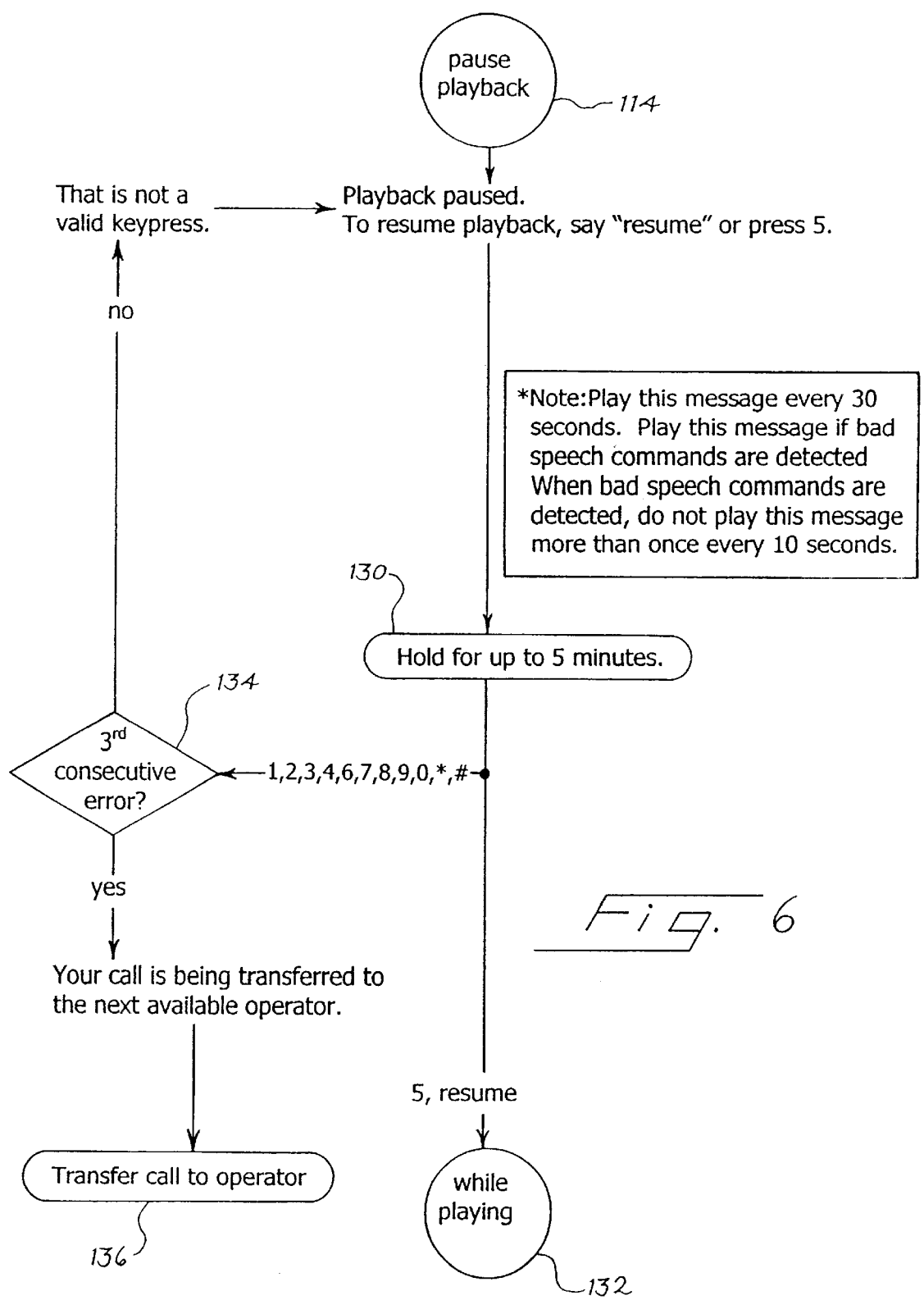

Referring to FIG. 6, shown are the available menu commands from the pause feature selected at step 114 of FIG. 5. In this illustrative embodiment, a message indicating the instructions have been paused is played every 30 seconds. At step 130, the playback can be paused for up to 5 minutes. At step 132, the playback of the instructions is resumed by requesting "resume" or entering the "5" key. At step 134, the number of invalid verbal or key entries are counted and maintained. In the pause menu of FIG. 5, the "resume" or "5" key are the only valid entries. All other key entries (1, 2, 3, 4, 6, 7, 8, 9, 0, *, #) or verbal commands are invalid. If speech that cannot be interpreted as valid commands are detected, the pause message is played no more than every 10 seconds. Invalid entries are indicated to the caller. At step 136, if the number of invalid entries during the pause feature exceeds 3 consecutive errors, the user may be having some difficulty with the system and is transferred to an operator console for assistance.

Referring again to FIG. 5, at step 116, requesting "spelling" or entering the "3" key causes the current step of the route instructions to be repeated in a spelling mode by the user. The spelling mode spells out the name of the streets contained in the directions. For example, the instructions "turn right on Elm" would also include the instruction "Elm is spelled E, L, M." By providing the spelling of street names, the spelling mode makes the streets easier to find and the route instructions easier for a user to follow.

At step 118, saying "back up" or pressing the "7" key allows the user to back up to the previous step in the directions.

At step 120, saying "repeat" or by pressing the "8" key cause the current direction step to be repeated. At step 122, the directions can be skipped ahead one step by requesting "skip ahead" or by pressing 9. At step 124, operator assistance can be obtained by requesting "operator" or by pressing the "0" key. At step 126, the playback of the route directions can be paused and the available instructions menu can be played by requesting "instructions" or by pressing the star key * followed by zero.

After each step of the route instructions, if no command is given within a timeout period, the system will continue automatically to the next route instruction step. Preferably, the timeout is configurable by the system but is typically set to a range of 2–4 seconds. In addition, each step of the route instructions may be proceeded by a step number identifying that step of the route directions (e.g., Step X: Turn <direction> on <street>).

After each step of the directions at step 128, a determination is made whether the end of the route instructions or directions has been reached (i.e., the last step) or there are additional steps in the route instructions remaining to reach the destination. Preferably, the last step of the route instructions will indicate total trip distance and need not be preceded by a step number.

At step 130, if there are additional route instruction steps remaining, the system is in a post step state to play the remaining direction steps. At step 132, if the end of the route instructions have been reached, the system is in a post step state ready to proceed to the next step of the directions.

Referring now to FIG. 7, shown are the commands available at step 130 of FIG. 5 after each step of the directions have been played. As shown in FIG. 7, the playback of the route instruction can be started over from the beginning by stating "start over" or by pressing the "1" key on the keypad at step 140. At step 142, the user can say "continue" or press the "2" key to proceed to hear the next step of the route instructions. At step 144, the user can pause the playback of the directions by requesting "pause" or by pressing the "5" key. Playback can be resumed by requesting "resume" or by pressing the "5" key again. The menu selections available from the pause features are those previously shown in FIG. 6.

At step 146, the current step of the route instructions is repeated in a spelling mode. The spelling mode spells out the name of the streets in the route instructions as described at step 116 of FIG. 5.

At step 148, saying "back up" or pressing the "7" key allows the user to back up to the previous step in the route instructions.

At step 150, the current step of the route instructions can be repeated by saying "repeat" or by pressing 8. At step 152, the directions can be skipped ahead one step by saying "skip ahead" or by pressing 9. At step 154, operator assistance can be obtained by requesting "operator" or by pressing the "0" key. At step 156, the playback can be paused and the available instructions menu can be played by requesting "instructions" or by pressing the star key * followed by zero.

Figure 8:
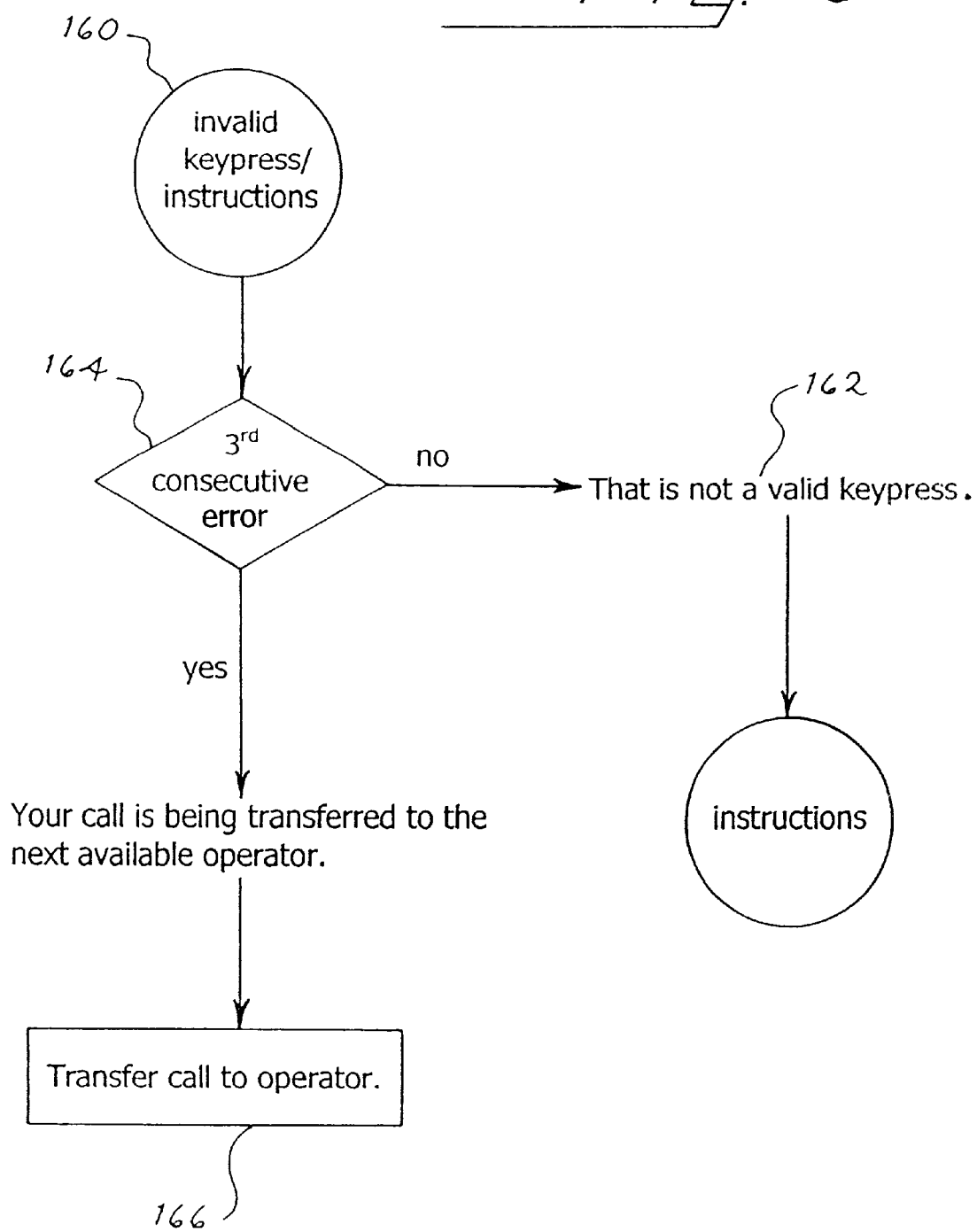

At steps 158 and 160, unrecognized speech commands and invalid key entries are handled. FIG. 8, shows allowing callers 3 chances to enter a valid selection. After an invalid selection at step 160, callers will be informed of their invalid selection and given an opportunity to select another option at step 162. At step 164, the number of consecutive invalid selections are maintained. At step 166, after 3 invalid selections, users will be transferred to a live operator for assistance. Likewise, users will have 3 chances to speak a valid command or be transferred to a live operator. Preferably, the live operator will have access to the user's session including his requests for information and the received responses. FIGS. 9 through 12 show an illustrative embodiment of a menu command structure for handling unrecognized commands.

Figure 9:
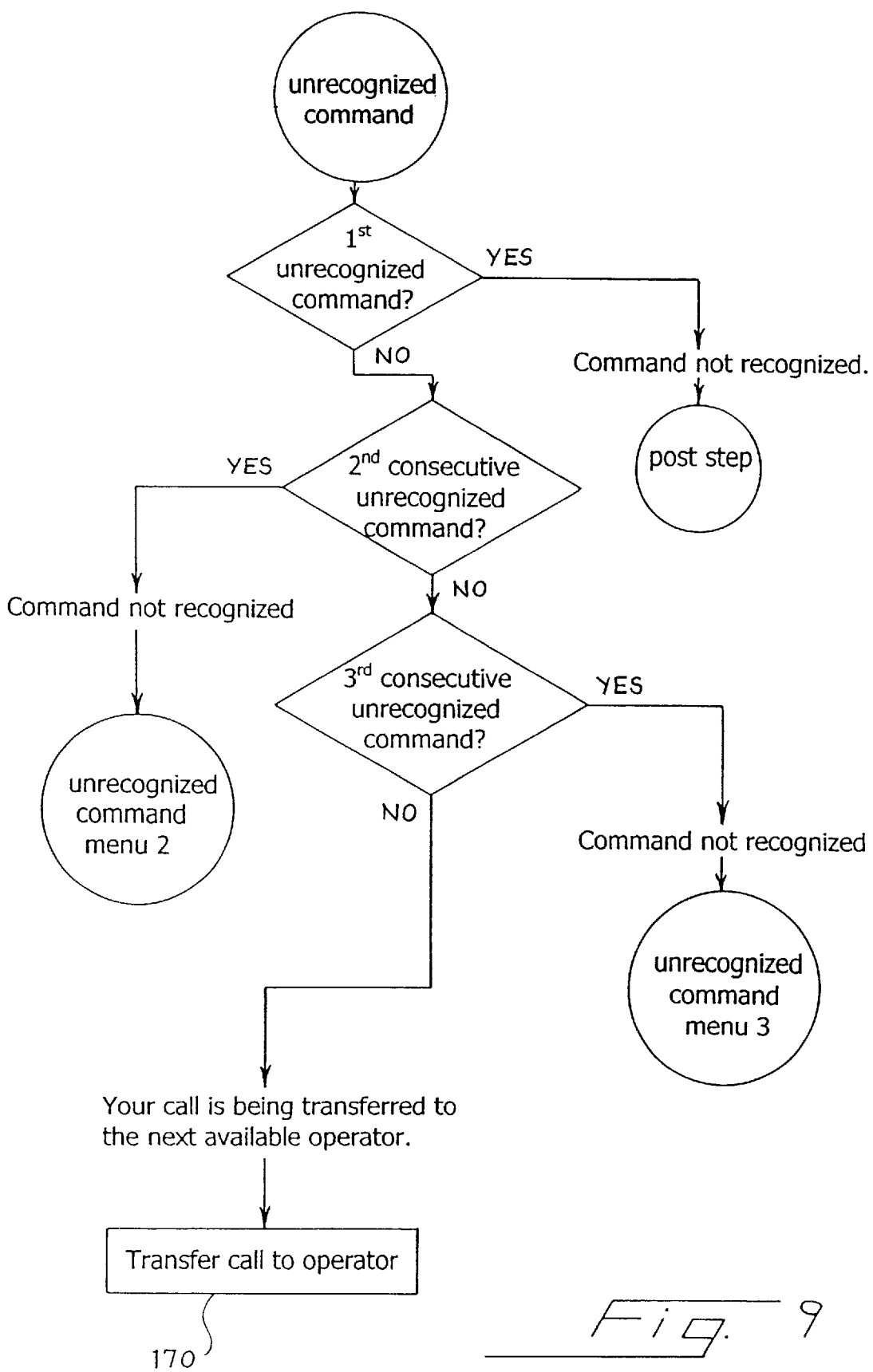
Figure 10:
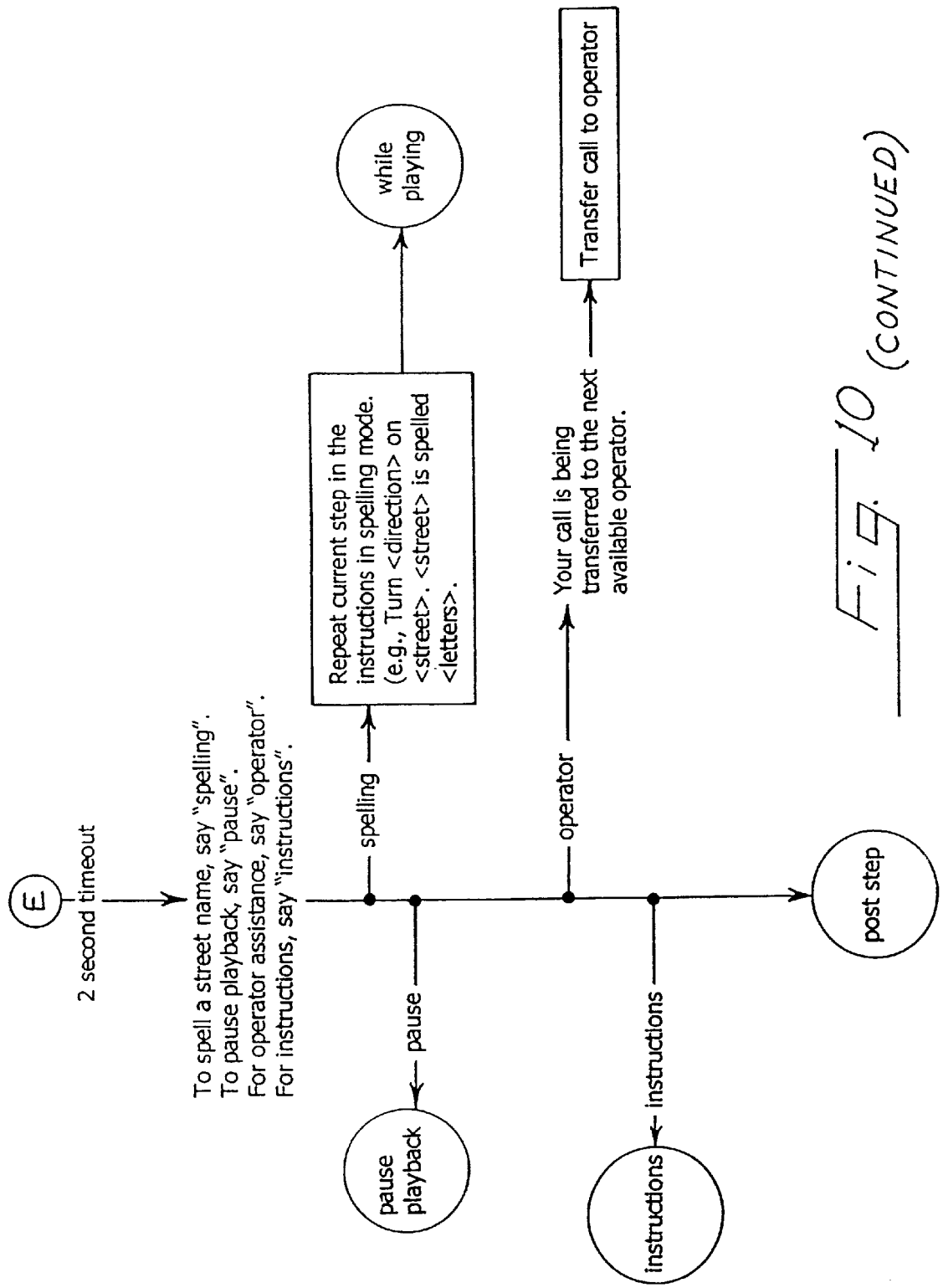
Figure 11:
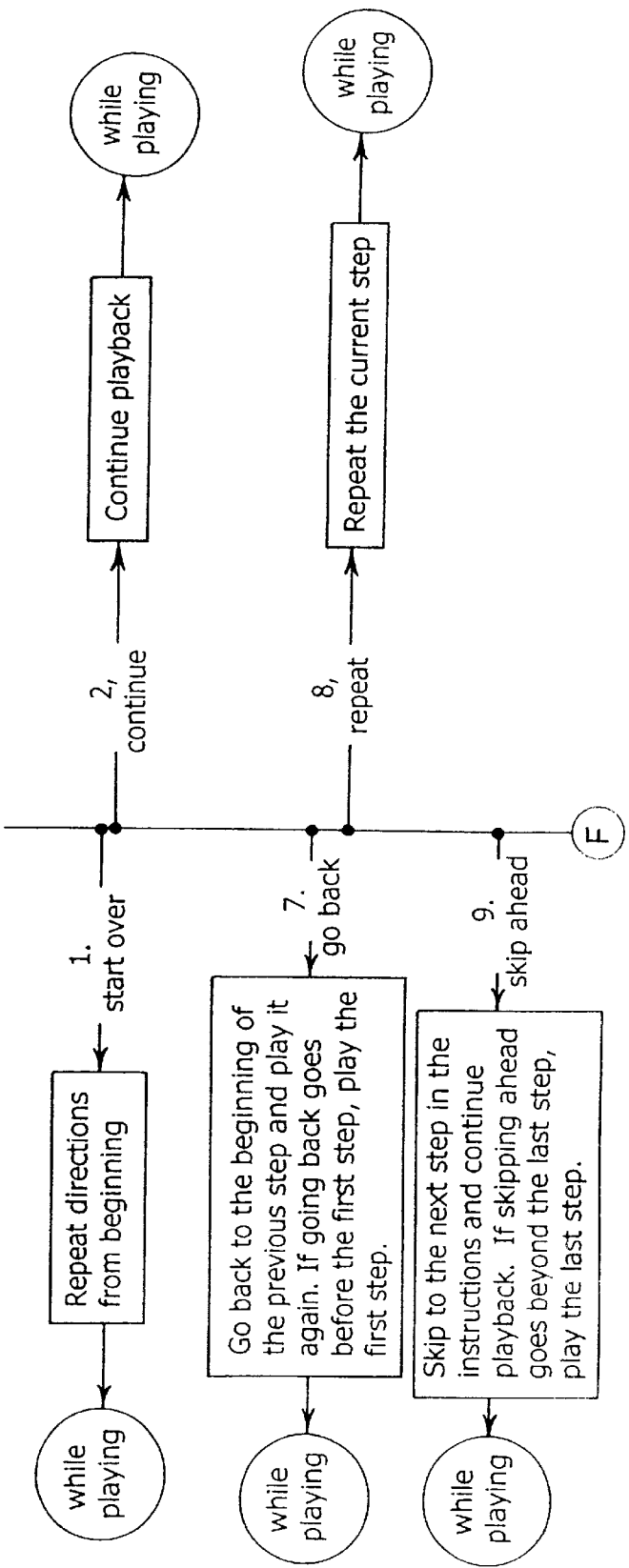

FIGS. 9–11 shows exemplary error handling for unrecognized commands received from the user. The exemplary embodiment of the error handling shown in FIG. 9 allows 3 consecutive unrecognized commands or errors before sending the user to a live operator 170 for assistance. After each unrecognized command, the user may be given additional assistance as shown in FIGS. 10 and 11.

Figure 12:
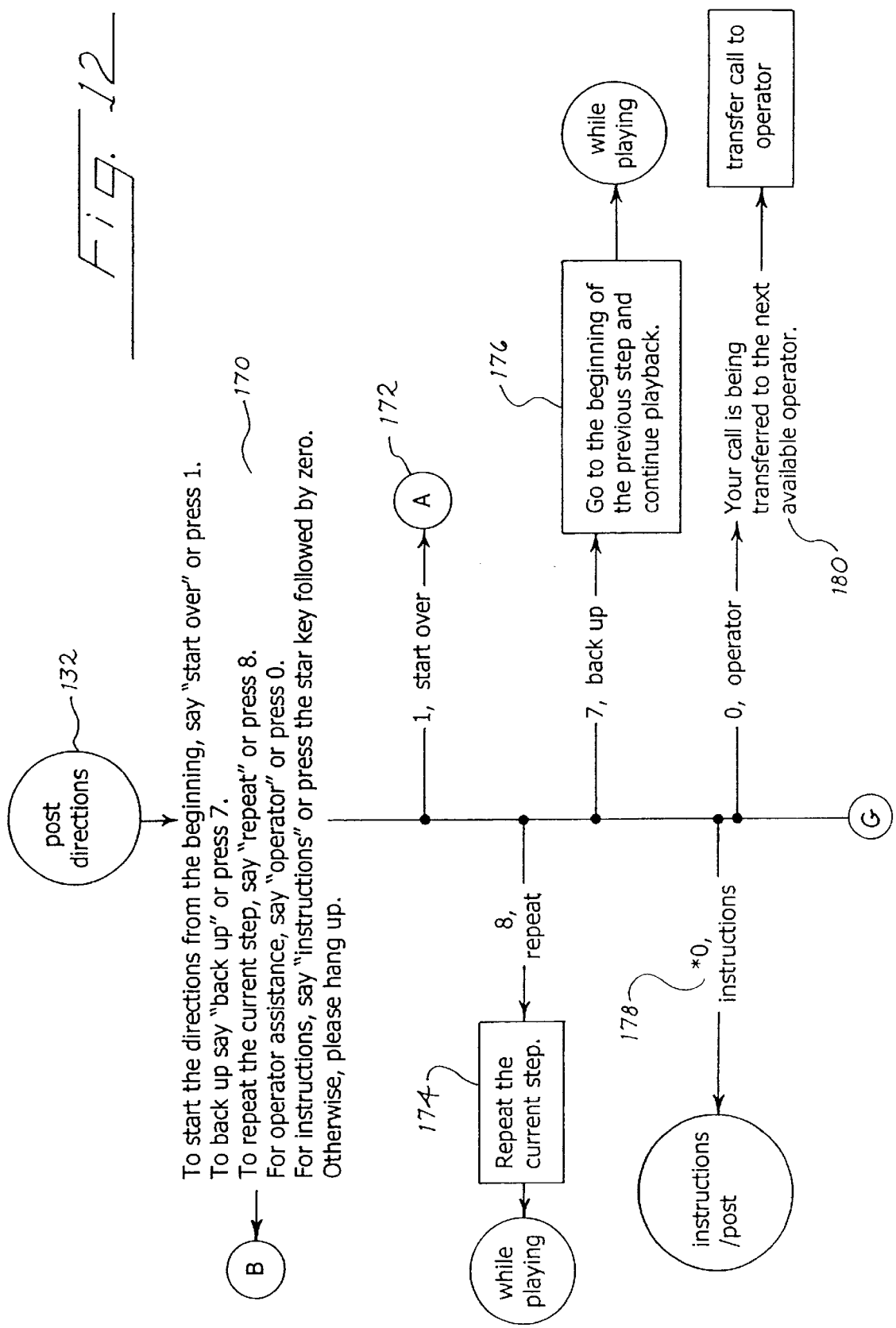
Figure 12:
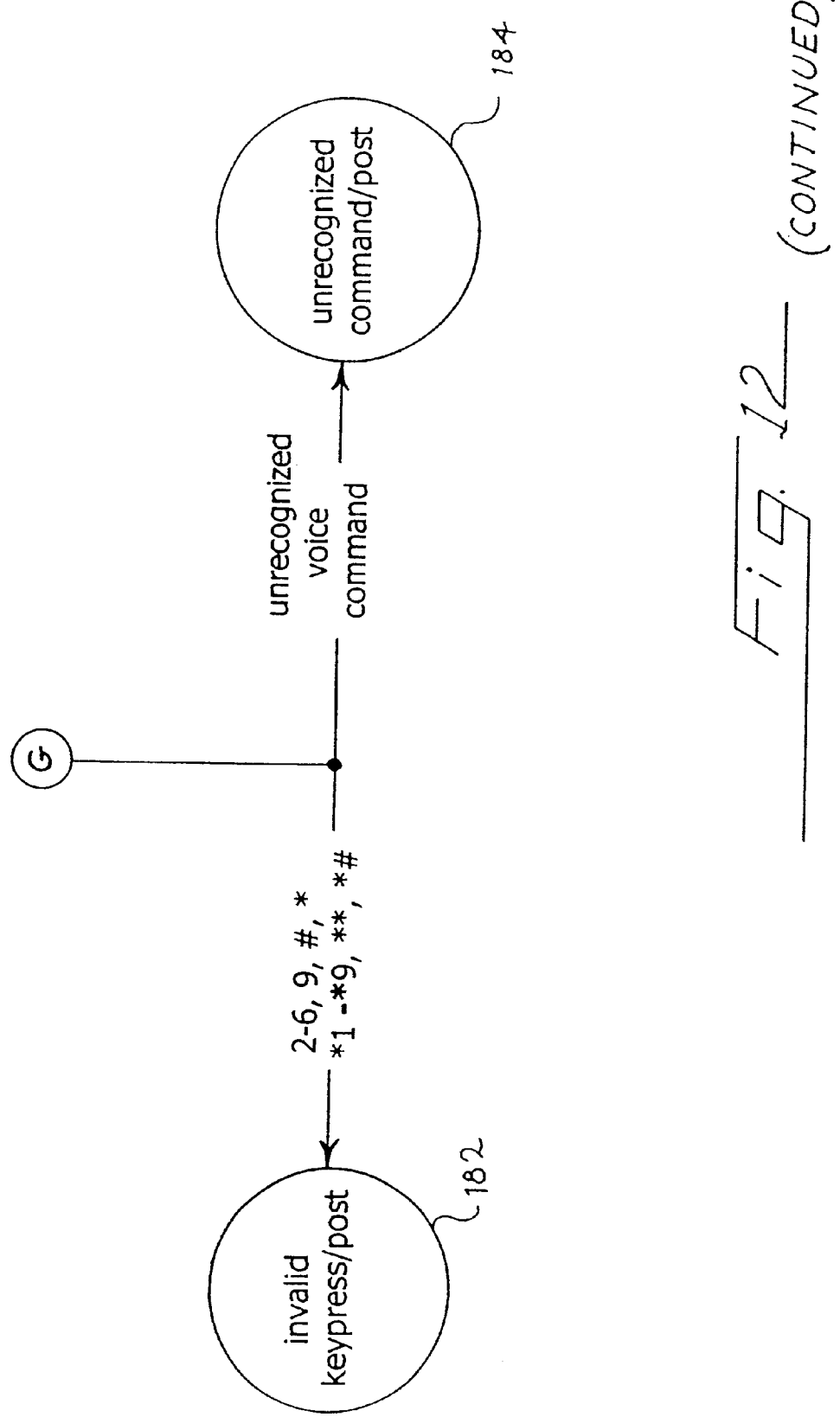

FIG. 12 shows the menu commands at the post directions of step 132 of FIG. 5. After the route directions have been played, the available commands are played back to the user at step 170. At step 172, requesting "start over" or entering a "1" key starts the direction over at the beginning. At step 174, requesting "repeat" or entering the "8" key repeats the current step direction. At step 176, requesting "back up" or entering the "7" key goes back to the beginning of the previous step and continues the playback of the route directions. At step 178 the available instructions menu can be played by requesting "instructions" or by pressing the star key * followed by zero. At step 180, operator assistance can be obtained by requesting "operator" or by pressing the "0" key. At steps 182 and 184, invalid entries and unrecognized commands are handled as previously described.

The present embodiment may also be realized as a method of providing information over a telephone line. The method may be embodied in the form of executable code running on a processing system with a high-speed Central Processing Unit ("CPU") 48 and a memory system 52. In accordance with the practices of persons skilled in the art of computer programming, the present invention is described below with reference to acts and symbolic representations of operations that are performed by the computer processing system, unless indicated otherwise. Such acts and operations are sometimes referred to as being "computer-executed", or "CPU executed."

It will be appreciated that any symbolically represented operations or acts described include the manipulation of electrical signals by the CPU. The electrical system represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained also include physical locations that have particular electrical, magnetic, optical, or organic properties corresponding to the stored data bits.

The data bits may also be maintained on a computer readable medium including magnetic disks, optical disks, organic disks, and any other volatile or (e.g., Random Access memory ("RAM")) non-volatile (e.g., Read Only Memory ("ROM")) storage system readable by the CPU. The computer readable medium includes cooperating or interconnected computer readable media, which exist exclusively on a processing system or is distributed among multiple interconnected processing systems that may be local or remote to the processing system.

The present embodiment preferably includes a software module as a set of computer executable software instructions. The software instructions are executed as data bits by the CPU with a computer memory system. The software instructions cause CPU to access the gain lookup table preferably stored in data memory. In an alternate embodiment, the software instructions may evaluate a function to calculate the appropriate amplification gain without requiring an access to a gain lookup table stored in memory. The executable code may implement, for example, the methods described in further detail below.

Figure 13:
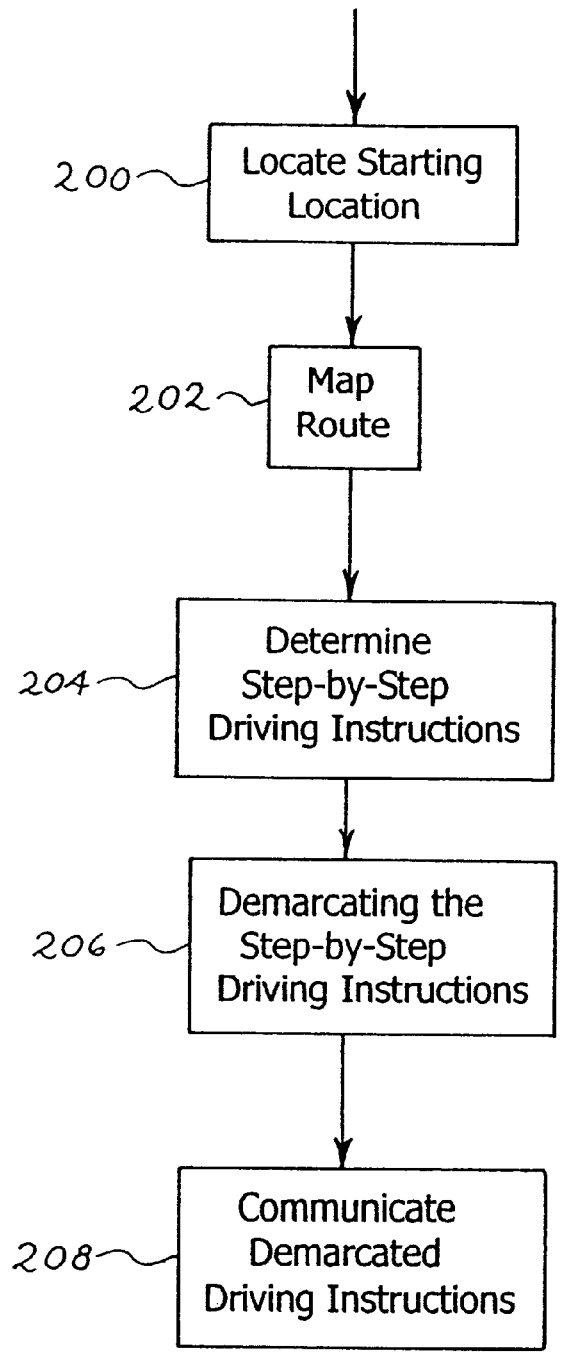
FIG. 13 is a flow chart of an illustrative method used in the system of FIG. 1.

Referring to FIG. 13, the starting location, usually the current location of the caller, can be determined at step 200 using an ALI technology. The ALI can identify the location of the caller implementing any of the ALI technologies previously described. The caller's location can then be used to populate the call detail, which is passed onto to the operator console to be available for the operator during the transaction with the caller.

At step 202, the starting location determined in step 200 can be used with a selected destination location and a route between the two locations can be mapped. In an illustrative embodiment, a database can provide the geographical locations of the starting and destination locations. The route is mapped between the geographical starting and destination locations with a software program. Preferably, a route database is used to determine the route between the two starting and destination locations as previously described above. At step 204, the step-by-step street driving route instructions are determined to provide specific directions from the staring location to the destination location. The route instructions can be determined according using a routing database as previously described.

At step 206, the step-by-step route instructions are segmented and demarcated between each step of the instructions. For example, at each point in the instructions where the route instruction instructs the caller to changes from one road to another i.e., "turn right on ELM," "turn right on Main Street." The segmentation of the route instructions provides convenient points for the interactive user interface to stop, pause, and repeat the driving instructions. Use of the demarcated route instructions to provide a convenient mechanism for the call to control the playback of route driving instructions is described previously above.

At step 208, the interactive user interface communicates the demarcated route instructions. The interactive user interface provides a convenient interface to allow the user to receive route instructions over the telephone. The user interface preferably uses the demarcated route instructions to allow a user to control the playback of the instructions as described in reference to FIGS. 4–12.

The present embodiment preferably includes logic as a computer executable software instructions. The software can be adapted to be executed by any general purpose Computer Processing Unit ("CPU") or microprocessor controlling the operation of the system. Although the illustrative system uses an IBM RISC 6000 computer system may other computer systems/microprocessors are suitable for implementing the described system and methods. The microprocessor executes software that can be programmed by those of skill in the art to provide the desired functionality as described in the included Figures. The software can be represent as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the system's operation.

The illustrative embodiment improves the usability of the system and improves the productivity of the operator console position. The automatic location identification a eliminates the need for callers to identify their location when calling into the system for assistance. The automatic location identification also speeds the handling of calls at the operator console by eliminating the step of querying the caller for his location. The interactive user interface allows the user to more easily obtain the route instructions by providing a mechanism to start and stop the directions at convenient points. The interactive user interface also improves the productivity of the operator console by allowing the operator to pass the caller off to the interactive user interface and move on to handle the next caller.

It is to be understood that both the foregoing general description and the following detailed description are exemplary and explanatory and are intended to provide further explanation of the invention as claimed. Numerous modifications and variations are possible. For example, the steps of the flow diagrams may be taken in sequences other than those described and the invention may be practiced with more or fewer elements than those shown. It is intended that the foregoing detailed description be regarded as illustrative rather than limiting. It is the following claims, including all equivalents, which are intended to define the scope of this invention.

We claim:

1. A system for providing a telephone caller driving route instructions from a calling location to a destination location comprising:
    an automatic location identification for automatically identifying the calling location from where the telephone caller originated the telephone call;
    a database for mapping route instructions from the calling location to the destination location, wherein the route instructions are coded at demarcated points to allow for manipulation of the route instructions during playback; and
    an interactive user interface accessible over a telephone call for communicating route instructions to the telephone caller, wherein the interactive user interface provides a user with commands at each demarcated point to manipulate, during playing, the playback of the route instructions.

2. The system of claim 1 wherein the automatic location identification for identifying the calling location further comprises:
    automatic number identification for identifying the calling party telephone number; and
    a telephone number database for determining the address of the calling party telephone number.

3. The system of claim 2 wherein the telephone number database comprises a name, address and telephone number database (NATD) containing geo-code information identifying the geographic location of the telephone caller.

4. The system of claim 3 wherein the geo-code information identifying the geographical location comprises longitude and latitude coordinates.

5. The system of claim 1 wherein the route instructions comprise street driving instructions between the calling location and the destination location.

6. The system of claim 1 wherein the route instructions are step-by-step driving instructions which have been demarcated at each step of the instructions.

7. The system of claim 1 wherein the automatic location identification identifies the caller location comprising a dedicated radio-location network.

8. The system of claim 1 wherein the automatic location identification identifies the caller location comprising a GPS location system.

9. The system of claim 1 the interactive user interface comprising:
    a gateway for translating the route instructions to an audio box for speech synthesis; and
    an audio box for receiving the translated route instructions and verbalizing the route instructions.

10. A system for providing a telephone caller driving instructions from a calling location to a destination location comprising:
    an automatic location identification for automatically identifying the calling location from where the telephone caller originated the telephone call, comprising:
        automatic number identification for identifying the calling party telephone number; and
        a telephone number database for determining the address of the calling party telephone number;
        a database for mapping route instructions from the calling location to the destination location, wherein the route instructions are coded at demarcated points to allow for manipulation of the route instructions during playback; and
    an interactive user interface accessible over a telephone call for communicating route instructions to the telephone caller, wherein the interactive user interface provides a user commands at each demarcated point to manipulate, during playing, the playback of the route instructions, comprising:
        a gateway for translating the route instructions to an audio box for speech synthesis; and
        an audio box for receiving the translated route instructions and verbalizing the route instructions.

11. A method of providing driving instructions between a starting location and destination location to a telephone caller comprising the steps of:
    locating the starting location using an automatic location identification technology;
    mapping a driving route between the starting location and the destination location;
    determining step-by-step driving instructions in accordance with the step of mapping the driving route;
    coding the driving instructions at each step of the directions into segments, wherein the coded driving instructions can be manipulated during playback by commands provided to a user at each segment using an interactive user interface; and
    communicating the driving instructions over a telephone line with an interactive user interface adapted to communicate the coded driving instructions.

12. The method of claim 11 wherein the interactive user interface comprises the capability of pausing the instructions at a coded segment.

13. The method of claim 11 wherein the interactive user interface comprises the capability of repeating the segment of the instructions at a coded segment.

14. The method of claim 11 wherein the interactive user interface comprises the capability of repeating the instructions from the beginning at a coded segment.

15. A system for providing a telephone caller driving route instructions from a starting location to a destination location comprising:

- a database for mapping route instructions from the starting location to the destination location, wherein the route instructions are coded at demarcated points to allow for manipulation of the route instructions during playback; and
- an interactive user interface accessible over a telephone call for communicating route instructions to the telephone caller, wherein the interactive user interface provides a user with commands at each demarcated point to manipulate, during playing, the playback of the route instruction.

16. The system of claim 15 wherein the commands are activated by a telephone caller's voice.

17. The system of claim 15 wherein the commands are activated by a depressing a key from the DTMF keypad.

18. The system of claim 15 wherein the route instructions comprise street driving instructions between the starting location and the destination location.

19. The system of claim 15 wherein the route instructions are step-by-step driving instructions which have been demarcated at each step of the instructions.

20. The system of claim 15 the interactive user interface comprising:

- a gateway for translating the route instructions; and
- an audio box for receiving the translated route instructions and verbalizing the route instructions.

21. A system for providing a telephone caller driving route instructions from a starting location to a destination location comprising:

- a database for mapping route instructions from the starting location to the destination location, wherein the route instructions are coded at demarcated points to allow for manipulation of the route instructions during playback;
- an interactive user interface accessible over a telephone call for communicating route instructions to the telephone caller, wherein the interactive user interface provides a user with commands at each demarcation point to manipulate, during playing, the playback of the route instructions;
- a gateway for translating the route instructions to an audio box for speech synthesis; and
- an audio box for receiving the translated route instructions and verbalizing the route instructions.

* * * * *